United States Patent [19]

Gusack

[11] Patent Number: 6,112,209
[45] Date of Patent: Aug. 29, 2000

[54] ASSOCIATIVE DATABASE MODEL FOR ELECTRONIC-BASED INFORMATIONAL ASSEMBLIES

[76] Inventor: Mark David Gusack, 9800 NW. 47 Dr., Coral Springs, Fla. 33076-2602

[21] Appl. No.: 09/099,232

[22] Filed: Jun. 17, 1998

[51] Int. Cl.[7] .................................................. G06F 17/30
[52] U.S. Cl. ................................ 707/101; 707/1; 707/2; 707/3; 707/6; 707/7; 707/100; 707/102; 707/104; 707/200; 707/201
[58] Field of Search ................................ 707/1, 2, 3, 6, 707/7, 100, 101, 102, 104, 200, 201; 375/133; 700/247; 717/7

[56] References Cited

U.S. PATENT DOCUMENTS

| | | | |
|---|---|---|---|
| 4,571,700 | 2/1986 | Emry, Jr. et al. | 707/101 |
| 4,631,664 | 12/1986 | Bachman | 707/100 |
| 4,787,035 | 11/1988 | Bourne | 700/247 |
| 4,905,138 | 2/1990 | Bourne | 717/7 |
| 4,933,848 | 6/1990 | Haderle et al. | 707/201 |
| 4,947,320 | 8/1990 | Crus et al. | 707/100 |
| 4,959,769 | 9/1990 | Cooper et al. | 707/100 |
| 4,979,109 | 12/1990 | Tanaka et al. | 707/100 |
| 5,204,958 | 4/1993 | Cheng et al. | 707/1 |
| 5,253,361 | 10/1993 | Thruman et al. | 707/1 |
| 5,257,365 | 10/1993 | Powers et al. | 707/1 |
| 5,303,367 | 4/1994 | Leenstra, Sr. et al. | 707/1 |
| 5,414,841 | 5/1995 | Bingham et al. | 707/1 |
| 5,444,842 | 8/1995 | Bentson et al. | 395/161 |
| 5,448,727 | 9/1995 | Annevelink | 707/1 |
| 5,530,854 | 6/1996 | Emery et al. | 707/1 |
| 5,537,689 | 7/1996 | Daial | 707/1 |
| 5,546,571 | 8/1996 | Shan et al. | 707/3 |
| 5,548,751 | 8/1996 | Ryu et al. | 707/1 |
| 5,553,218 | 9/1996 | Li et al. | 707/1 |
| 5,557,786 | 9/1996 | Johnson, Jr. | 707/1 |
| 5,560,006 | 9/1996 | Layden et al. | 707/1 |
| 5,561,793 | 10/1996 | Bennett et al. | 707/1 |
| 5,592,666 | 1/1997 | Perez | 707/1 |
| 5,594,899 | 1/1997 | Knudsen et al. | 707/1 |
| 5,603,025 | 2/1997 | Tabb et al. | 707/2 |
| 5,604,899 | 2/1997 | Doktor | 707/3 |

(List continued on next page.)

OTHER PUBLICATIONS

Date, C.J. 1995 An Introduction to Database Systems pp. 68–70.
Connolly, Thomas M. 1996 Database Systems pp. 163–224.
Atre, Shaku 1988 Data Base pp. 58–151 & 281.
Ricciardi, S. Aug. 1994 A Guide to Data Integrity Rules pp. 387–390.

*Primary Examiner*—Thomas G. Black
*Assistant Examiner*—Diane D. Mizrahi

[57] ABSTRACT

An indexing system and linking method for an assembly of electronic-based informational items stored in and ordered by a plurality of records uniquely identified over a plurality of relational data tables making up a data set wherein each table is assigned a unique domain of unique alphanumeric indicia for assignment and storage in the records. The records are ordered by the alphanumeric indicia whereby each data table acts as its own primary key. The records are bi-directionally linked to each other via a plurality of separate, central linking table indexes wherein each index record is structured with a plurality of linking fields defined to store sets of two or more alphanumeric indicia belonging to a plurality of records in the data set. Each record is further structured to include an internal set of unique indicum for each data field whereby the combination of the unique record indicum and the unique field indicum uniquely identify each record-field over the plurality of relational data tables making up the data set such that each record field may be linked to a plurality of other record-fields or records via the plurality of separate, central linking table indexes. Each central linking table indexes is further generalized to provide multiple arrays of linking indicia in a plurality of indexing fields such that a plurality of the records from a plurality of the data tables may be linked together as a data cluster. The linking values stored in the central linking table indexes may be predefined to automatically structure and link a plurality of unspecified data and changes in the data may alter the linking structure to provide further capabilities.

22 Claims, 26 Drawing Sheets

U.S. PATENT DOCUMENTS

| | | | |
|---|---|---|---|
| 5,615,367 | 3/1997 | Bennett et al. | 707/102 |
| 5,621,753 | 4/1997 | Weber | 375/133 |
| 5,649,190 | 7/1997 | Sharif-Askary et al. | 707/101 |
| 5,649,192 | 7/1997 | Stucky | 707/104 |
| 5,671,406 | 9/1997 | Lubbers et al. | 707/7 |
| 5,694,594 | 12/1997 | Chang | 707/6 |
| 5,701,453 | 12/1997 | Maloney et al. | 707/2 |
| 5,717,922 | 2/1998 | Hohensse et al. | 707/100 |
| 5,724,577 | 3/1998 | Exley et al. | 707/100 |
| 5,778,375 | 7/1998 | Hecht | 707/101 |

TABLE REGISTRY DATA FILE

| TIN | TABLE NAME | DOMAIN SIZE | DOMAIN START | DOMAIN END | CLTF | CLTB | LINK |
|-----|------------|-------------|--------------|------------|------|------|------|
| 1 | TABLE 1 | 1,000,000,000 | 0 | 999,999,999 | | | |
| 2 | TABLE 2 | 1,000,000,000 | 1,000,000,000 | 1,999,999,999 | | | 1 |
| 3 | TABLE 3 | 1,000,000,000 | 2,000,000,000 | 2,999,999,999 | | | |
| . | . | . | . | . | . | . | . |
| . | . | . | . | . | . | . | . |
| N | TABLE N | 1,000,000,000 | N,000,000,000 | N,999,999,999 | | | N-1 |

TABLE 1

| L# | COLUMN 11 | COLUMN 12 | ... | COLUMN 1J |
|----|-----------|-----------|-----|-----------|
| 0 | DATA | DATA | ... | DATA |
| 1 | DATA | DATA | ... | DATA |
| 2 | DATA | DATA | ... | DATA |
| 3 | DATA | DATA | ... | DATA |

TABLE 2

| L# | COLUMN 21 | COLUMN 22 | ... | COLUMN 2K |
|----|-----------|-----------|-----|-----------|
| 1,000,000,000 | DATA | DATA | ... | DATA |
| 1,000,000,001 | DATA | DATA | ... | DATA |
| 1,000,000,002 | DATA | DATA | ... | DATA |
| 1,000,000,003 | DATA | DATA | ... | DATA |

TABLE 3

| L# | COLUMN 31 | COLUMN 32 | ... | COLUMN 3L |
|----|-----------|-----------|-----|-----------|
| 2,000,000,000 | DATA | DATA | ... | DATA |
| 2,000,000,001 | DATA | DATA | ... | DATA |
| 2,000,000,002 | DATA | DATA | ... | DATA |
| 2,000,000,003 | DATA | DATA | ... | DATA |

TABLE N

| L# | COLUMN 1 | COLUMN 2 | ... | COLUMN NM |
|----|----------|----------|-----|-----------|
| N,000,000,000 | DATA | DATA | ... | DATA |
| N,000,000,001 | DATA | DATA | ... | DATA |
| N,000,000,002 | DATA | DATA | ... | DATA |
| N,000,000,003 | DATA | DATA | ... | DATA |

FIG. 6

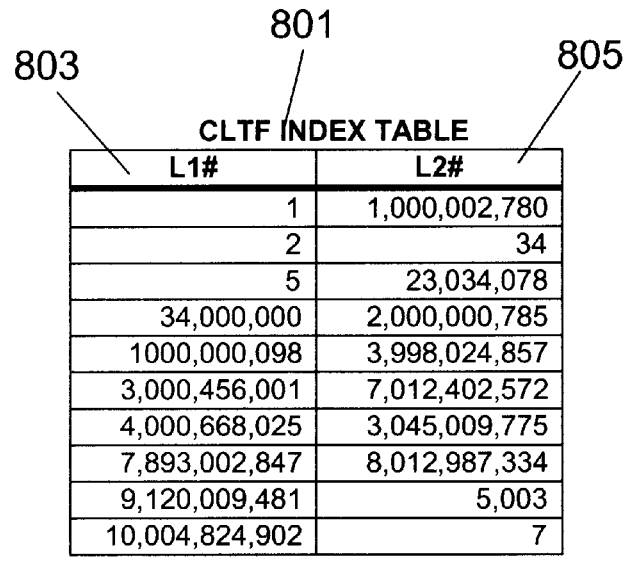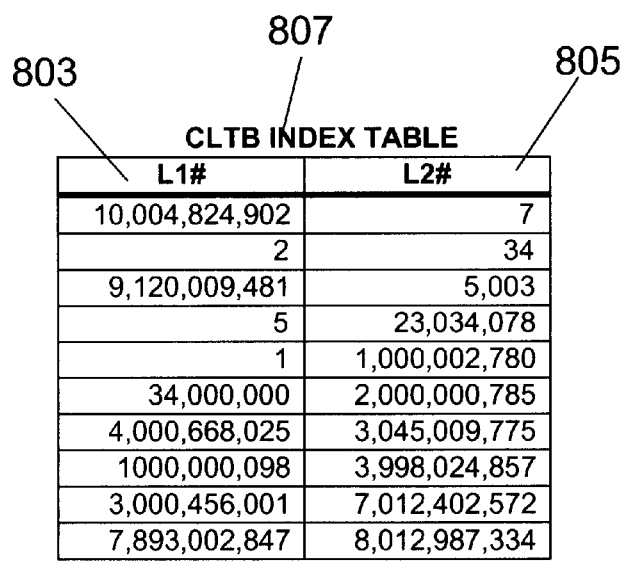
FIG. 8

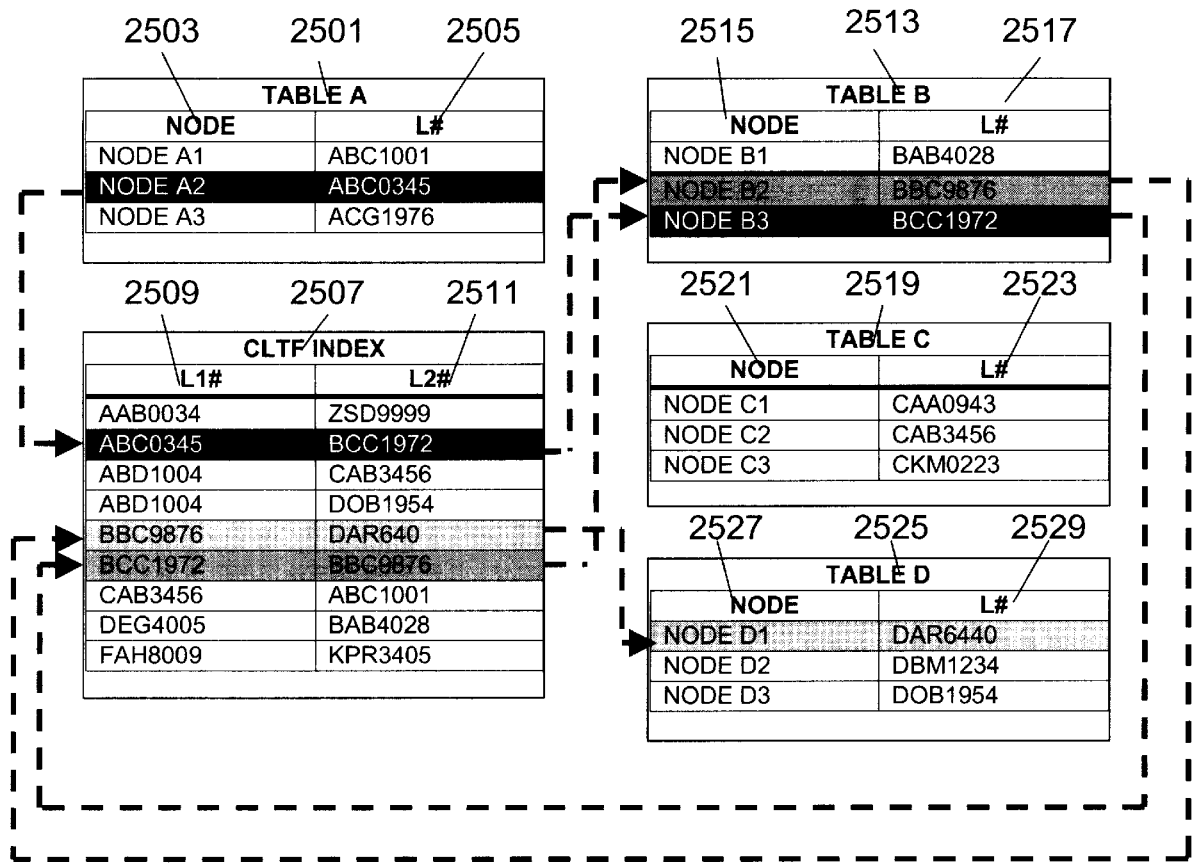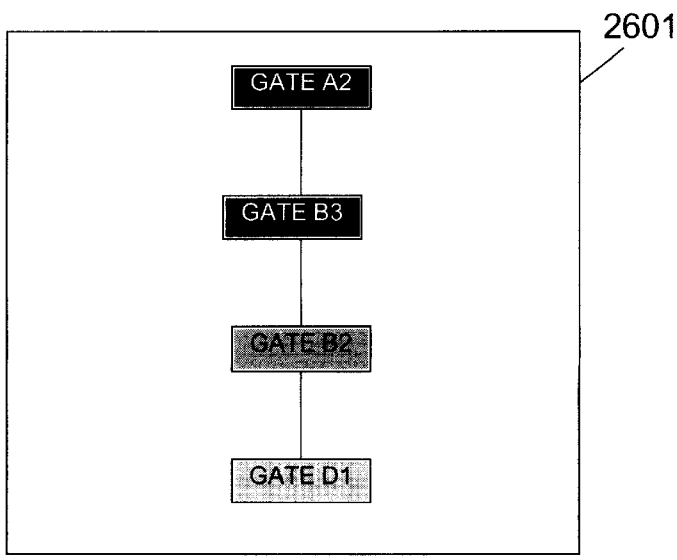
FIG. 26

ASSOCIATIVE DATABASE MODEL FOR ELECTRONIC-BASED INFORMATIONAL ASSEMBLIES

BACKGROUND—FIELD OF INVENTION

This invention relates to a unique indexing system, record structure, and linking methodology for bringing a high level of organization and flexibility to assemblies of information stored on electronic-based media.

BACKGROUND—DESCRIPTION OF PRIOR ART

Today, advances in computer technology have provided a plurality of temporary and permanent storage devices to store, organize, access, and manipulate a variety of data. Said devices include ferromagnetic rotating disks, magneto-optical disks, optical disks, dynamic random access memory, and static random access memory herein below referred to as electronic-based media. Historically, most data stored on said electronic-based media has been organized and accessed using a variety of systems such as hierarchical models, network models, and list models. All provide a set of capabilities which recommend them for the solution of specific information processing problems. One of the most common list models is the relational table with data normalization and linking between records stored in separate tables to create representations of real world processes such as accounting and inventory systems.

However, the very advantages created by the present relational model has created a new set of problems. The growing storage capacity and processing power of computers to run the relational data model has lead to an accelerating appetite for feeding ever-larger volumes of ever-more detailed information into them in an effort to gain additional control over management processes and compete more effectively in the market place. The increased volume and detail of the information gathered has, in turn, lead to a growing requirement for a more flexible and powerful method of ordering, linking, and accessing the data in order to facilitate the extraction of knowledge from the underlying information by rapidly reorganizing it, adding new types of information, and defining new types of relations between informational items.

A review of prior art reveals much attention has been paid to optimizing present database structures for speed and functionality within the strict limits of said hierarchical, networking, and relational models. Bachman (U.S. Pat. No. 4,631,664) utilizes a network data model to pair data elements together and to define their relationship. Thurman et al. U.S. Pat. No. (5,253,361) utilizes a composite index storing arrays of identifiers to locate pages of linked records. Leenstra, Sr. et al. (U.S. Pat. No. 5,303,367) introduces the concept of storing all data elements in a single tabular structure and then linking data together in a data array structure. Perez (U.S. Pat. No. 5,592,666) introduces the concept of a multidimensional array of database pointers to locate data nodes in an hierarchical data structure. Doktor (U.S. Pat. No. 5,604,899) defines a data relationships processor that allows a user to create additional, direct relational links between two tables in a data set without having to restructure the data dictionary. Bennett et al. (U.S. Pat. No. 5,615,367) provide a system that provides an intelligent guess as to which common fields are to be linked during the design of a data set using a visual interface. Sharif-Askary et al. introduce the concept of creating a knowledge-base that defines all possible entity relationships in a data set. Hohensee and Sampson (U.S. Pat. No. 5,717,922) introduce the use of a logical link element defined for a group of uniquely identified data objects that defines the type of data in the data objects, the type of links, as well as source and target documents where a link is made.

A review of the literature on database theory and implementation reveals a focus on relational links and joins in data queries between tables of records with or without the use of stored procedures. For example, in An Introduction to Database Systems (Sixth Edition, Addison-Wesley Publishing Company 1995), C. J. Date details the various possible relations between tables of records through primary and secondary indexes. He also introduces the concept of defining a specialized relationship between the two data tables via a link to a third data table with two linking fields (page 68–70). In A Guide to Data Integrity Rules (PC Magazine, August 1994 pages 387–390) S. Ricciardi provides a comprehensive review of maintaining referential integrity in a relational data model. This includes the important concept of separately defining domains of allowable data types and value ranges for storing in predefined key fields of a table to assure that each record is uniquely identified within said table.

A review of high and low level database programming languages such as Object PAL/Paradox for Windows (licensed to Corel Corp. by Borland International) and Object Pascal/Delphi (Borland International) and database engines such as the Borland Database Engine and Microsoft's Access reveals a standard set of data models, relational procedures, and query language structures. The concept of pairing two unique indicum to provide a link between pairs of data—called a map or an association—can only be found in compiled data containers used in many programs today. This system generates unique identification numbers at run time, assigns them to data stored temporarily in memory and processes this data using said mapping. The most common usage is with arrays and string lists where the array or string value and its ordinal position in the array or list are the paired values. The linking relationship is fixed at compilation time and lasts only as long as the program is running.

These and other prior art reviewed fail to provide a comprehensive, bi-directional, hierarchical, non-hierarchical, recursive, and indirect means to link together any two or a plurality of informational items in an assembly of informational items stored on electronic-based media. In addition, each prior art solution ignores the special requirements for creating knowledge from an assembly of informational items where the relationships between said informational items do not fall within the strict relational model. For example, as presently designed, relational databases and their underlying data dictionaries are highly restrictive requiring the relationship be based on a specific set of one or a plurality of fields in a pair of linked tables. Said model only allows linking at the record level and does not provide a means to link individual fields within said records or to simultaneously link a plurality of fields and/or records located in more than two tables simultaneously in an hierarchical or nonhierarchical structure.

Furthermore, only those linking relationships between tables of records defined during the design phase of the data dictionary are allowed during day-to-day operations. This means that if there is a need to create a new linkage between a different set of records, the entire database must undergo a redesign which is costly in time and money. These design changes must be made by technical personnel who often do not understand the functioning system represented by the data model nor what the end user wants or needs.

Furthermore, the present relational model does not provide a means for introducing new data tables into the database without requiring a major redesign of the underlying data structure, the software program which runs it, and the user interface that allows access to the stored information.

Furthermore, the present relational model does not provide a means for defining and storing index arrays and procedures that join together multiple records from a plurality of tables into a linked data cluster.

Furthermore, the present relational model does not provide a means for predefining links outside said data tables and allowing the interlinking between a plurality of records to be controlled during run time by user changes in stored field values or by predefined algorithms that are initiated by said values and predefined links.

Each of these capabilities and many others not said above are key requirements for developing a useful knowledge-base from an assembly of informational items stored on electronic-based media by creating highly generalized data structures that more nearly parallel human associative memory. Their absence greatly limits the capacity of organizations to respond to changes in the business environment and add billions of dollars of cost to data processing.

For the foregoing reasons, there is a need for an improved data structure that provides an indexing system that allows for the use of a sophisticated linking methodology which, in turn, provides a simple, comprehensive, and efficient means for interrelating multiple informational items located within a plurality of data tables stored on electronic-based media. This improved indexing system is also needed to provide a highly organized data structure that allows for the integration of additional data tables at any time without requiring a significant redesign of the data dictionary, the software program, or user interface.

SUMMARY OF THE INVENTION

Accordingly, it is an object of this invention to provide a unique indexing system for an assembly of informational items stored on electronic-based media, constructed from at least one registration table and set of program instructions that assigns at least one unique alphanumeric indicum to each data table included in the database structure and, therefore provides a means for calculating at least one unique domain of alphanumeric indicia for each table registered in the data set, in turn, providing a means for calculating at least one unique indicia for each record and each field defined within each record in the entire data set, and therefore providing a higher degree of order, integrity, continuity, and user convenience in accessing and creating knowledge from the assembly of informational items stored in said data tables than data structures of prior art.

A further object of this invention is to provide an indexing system for this assembly of informational items that enables quick and easy revisions to a plurality of tabular files and their records of field entries in the data base structure while maintaining the originally designated high degree of order.

A still further object of this invention is to provide an indexing system for this assembly of informational items that enables the quick and easy addition of a plurality of new records and tabular files to the data structure while maintaining the originally designated high degree of order.

A still further object of this invention is to provide an indexing system for this assembly of informational items that enables the information about each link between informational items to be simultaneously utilized to maintain referential integrity of said links thus achieving a high level of stability of the originally designated high degree of order.

A still further object of this invention is to devise a storage and display structure for the assembly of informational items which facilitates the use of the indexing system and provides a means for executing linking methodologies to join said indexed information together to create complex compound structures.

A still further object of this invention is to provide a linking method whereby a plurality of non-sequential data entries in the assembly of informational items stored in a plurality of data tables may be joined together in a plurality of index arrays, lists, and tables so as to increase the degree of order in the assembly so that they may be more quickly and easily found.

A still further object of this invention is to provide a linking method whereby a plurality of non-sequential data entries in the assembly of informational items may be joined together so that they may be quickly and easily retrieved as a group for analysis while maintaining the originally designated high degree of order.

A still further object of this invention is to provide a linking method whereby a plurality of non-sequential data entries in the assembly of items stored in a plurality of tabular files may be joined together so that the user may extend a single item of information across a plurality of noncontiguous entry records and tabular files while maintaining the original high degree of order.

A still further object of this invention is to provide an indexing system and linking method that is fully backwardly compatible with prior art relational models so that legacy data may be integrated into the new data model while maintaining the original high degree of order.

BRIEF DESCRIPTION OF DRAWINGS

Various other objects, features, and attendant advantages of the present invention will be more fully appreciated as the same becomes better understood when considered in conjunction with the accompanying drawings.

FIG. 6 is a partial view of a registry table for storing information key to generating a unique record identification domain, a unique identification number for each record in the data set and for storing linking array data. Four more tables are shown as partial views positioned beneath the registry table illustrating a unique indicum assigned to each record in each table such that no two indicum for any record in the entire data set are the same in accordance with an embodiment of the present invention.

FIG. 8 is a partial view of two complementarily sorted central linking index tables in accordance with an embodiment of the present invention.

FIG. 26 is a partial view of four data tables, a central linking table, and a tree-node object to illustrate how a linking structure a master record points to may be changed by changing said editable alphanumeric value in the linking field of the top level record in the hierarchy in accordance with an embodiment of the present invention.

DETAILED DESCRIPTION OF THE PREFERRED EMBODIMENT

The significance of the present invention is best understood by presenting the basic theory about and description of the prior art relational model that the present invention proposes to replace.

Informational Divisions Organized in Tabular Structures

To facilitate storage, retrieval, and processing of assemblies of informational items in computers a plurality of informational divisions may be defined wherein each contains a plurality of similar informational items. Each said division of data is ordered into a list of informational items defining a separate data table which is stored on electronic-based media. Each set of informational items in said list define a row wherein a plurality of said rows, also called tuples, represent records within each said data table. A plurality of columns divide each record into a plurality of separate fields common to each record wherein alphanumeric, textual, graphic, date-time, logical, and symbolic data may be segregated by type and subject. Said plurality of data types are herein below referred to as informational items. Each record stored in a data table is uniquely identified by the stored informational items in one or a plurality of said data fields. Said uniquely identified records may be ordered by the creation of a primary and a plurality of secondary keys that may be created dynamically or maintained as separate index tables. The term index will be used herein below to referred to both terms to avoid confusion. Said primary index is usually created from the set of fields that uniquely identify each said record and is referred to as a unique index created from a subset of the data table fields maintained in said order. The index table is used to provide a convenient means of viewing and manipulating the underlying data table. This is achieved by assigning a unique alphanumeric indicium to each said record and ordering said records by said indicium in the data table such that said set of alphanumeric record indicum may be used to locate the entire record contents in the original data file. When a plurality of informational items are duplicated in a plurality of records within a data table, efficiencies may be obtained through normalization, whereby, sets of fields are split up into separate data tables so as to make each informational item so segregated unique. Records between two said data tables may then be linked back together by an identity between the informational contents of one or more fields located in each said table index. The structural and relational definitions of a plurality of such tables with their fields, index tables, and relational links is stored in a data dictionary herein below also referred to as a data set. This creates a powerful system for creating software program procedures to sort, filter, query, locate, and link large amounts of data for rapid access, analysis, and reporting.

Figure 1:
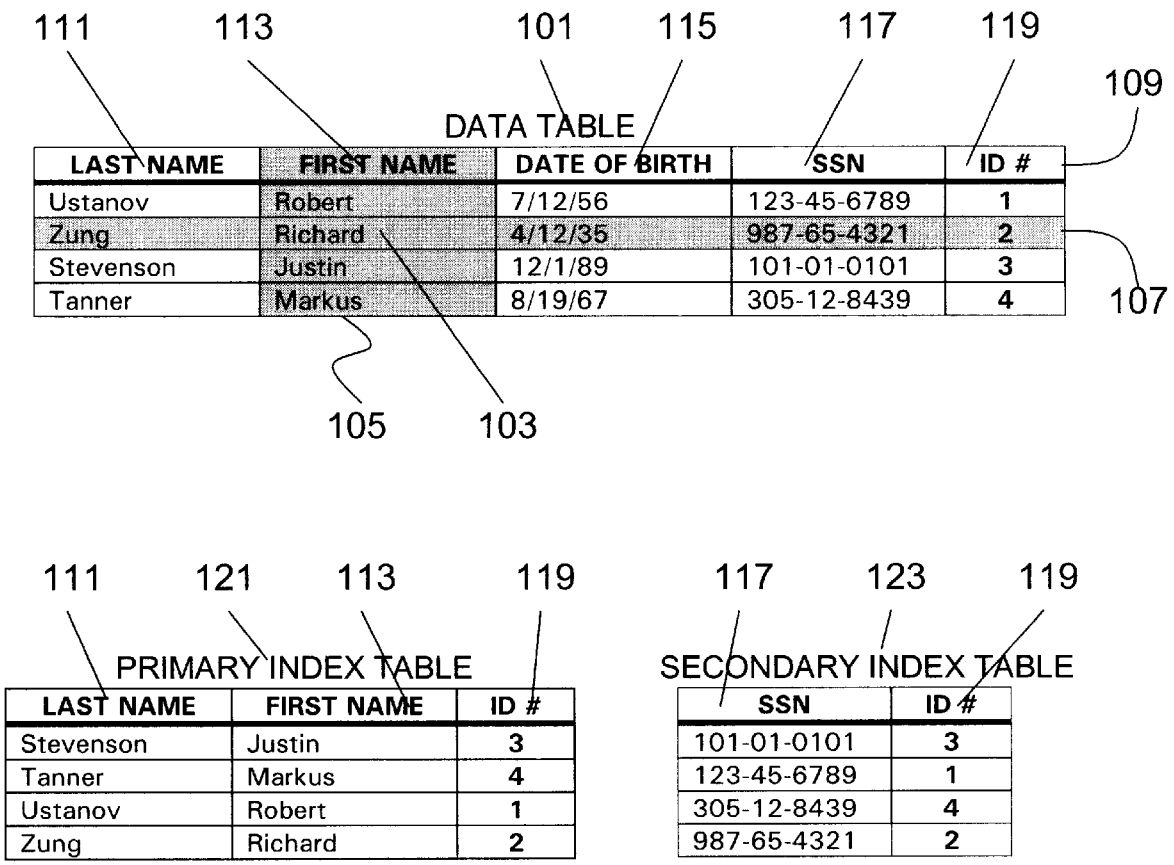
FIG. 1 is a partial view of a data table and two index tables to order said data table records in accordance with the prior art.

Definition of a Relational Data Table With Primary and Secondary Indexes: FIG. 1

Shown is a partial view of a plurality of records organized as a data table (101) stored on electronic-based media in a computer, consisting of a list of informational items, usually similar such as names, dates, address, and other data organized in separate fields (103) defined by a plurality of vertically oriented columns (105) (gray shading for illustrative purposes only) and horizontally oriented rows (107) (gray shading for illustrative purposes only). Each said column (105) represents a single entry field in said row (107) and defines its order within said row. Each row (107) represents an identical record of fields in said data table (101). When presented for viewing, each said column (105) may have a header defined by a preprinted label located at its top. A plurality of said assigned labels define a table header (109). As shown each said row (105) in said data table (101) contains a LAST NAME field (111), a FIRST NAME field (113), a DATE OF BIRTH field (115), and an SSN field (117) for storing said informational items. Each said record (103) also contains an ID# field (119) reserved for assigning an indicium unique within said data table. Said indicium defines the virtual order or absolute location of each said record (107) in said data table (101) as stored on electronic-based media and thus, provides the means to locate any particular record in said data table (101) through use of a separate index table ordered upon the values of a plurality of other fields in said data table (101). Also shown is a first index table (121) containing LAST NAME field (111), FIRST NAME field (113), and ID# field (119) that is ordered first on the LAST NAME field (111) and then on the FIRST NAME field (113) in ascending alphabetic order. Also shown is a second index table (123) containing SSN field (117) and ID# field (119) that is ordered on the SSN field (117) in ascending numeric order. For any record shown in either index (121, 123) the entire record of fields may be found in said data table (101) by searching for said record on said ID# field (119) value. The term entry field will be referred to as field herein below.

Figure 2:
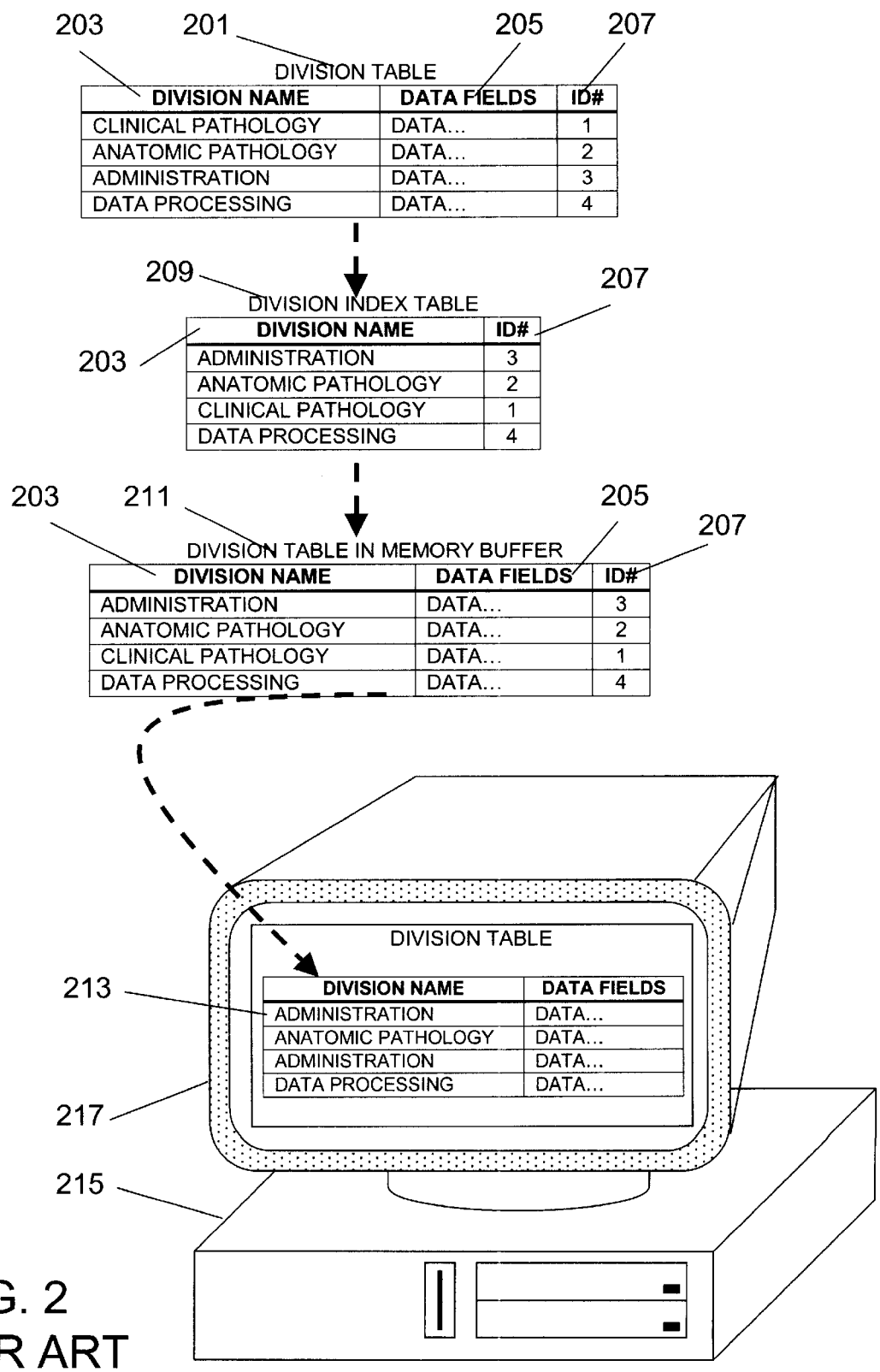
FIG. 2 is a partial view of a data table, an index table, a table stored in a memory buffer, and a computer with video monitor illustrating how data is ordered and displayed on a computer in accordance with the prior art.

Ordering Records in a Data Table and the Display of Said Data on a Computer Video Monitor: FIG. 2

Shown is a partial schematic view of a data table (201) stored on electronic-based media in a computer showing four records. Each record contains a DIVISION NAME field (203) for storing the names of laboratory divisions, a set of unspecified data fields (205) represented by the DATA FIELDS label, and an ID# field (207) for storing a unique record indicum for ordering said table records. Shown beneath said data table (201) is a partial schematic view of an index table (209) stored on electronic-based media containing (101) DIVISION NAME field (203) and (101) ID# field (207). The records in (101) index table (209) are sorted alphabetically by the contents of said DIVISION NAME field (203). Shown beneath said index table (209) is a partial schematic view of a table (211) temporarily stored in a random access memory buffer or virtual memory on electronic-based media referred to as a memory table herein below. Said memory table (211) contains the alphabetized listing of laboratory divisions, and one or more of the said unspecified data fields in said data table (201). Shown beneath said memory table (211) is an orthographic view of a generic computer (215) in which above said three tables are stored on electronic-based media and the data of which are processed by the hardware utilizing one or more of a plurality of microcode, firmware, and software that executes on said computer (215). Also shown is a video monitor (217) on which is shown a partial view of a table object (213) drawn on screen displaying an alphabetized listing of the contents of said DIVISION data (201) table stored on electronic-based media. Objects shown on said video monitor (217) are referred to as being part of or in the user interface herein below. Said memory table (211) is constructed by a sequence of programmatic instructions called a procedure herein after. One part of said procedure creates a table structured in a memory or virtual buffer substantially the same as that for said data table (201) stored on electronic-based media. Said procedure then accesses a first record in said index table (209). Said procedure then uses said unique record indicum (207) to locate the corresponding record in said data table (201), and copies some or all of said data table (201) record data fields (203, 205) into the first record of the memory table (211). Said procedure is repeated until said memory table (211) has been filled with records or until all of the available records in said data table (201) have been accessed. Finally, said procedure copies said memory table (211) to video memory whereby said computer BIOS functions or operating system application programming interface displays said data in said table object (213) on said video monitor (217) in said user interface.

Figure 3:
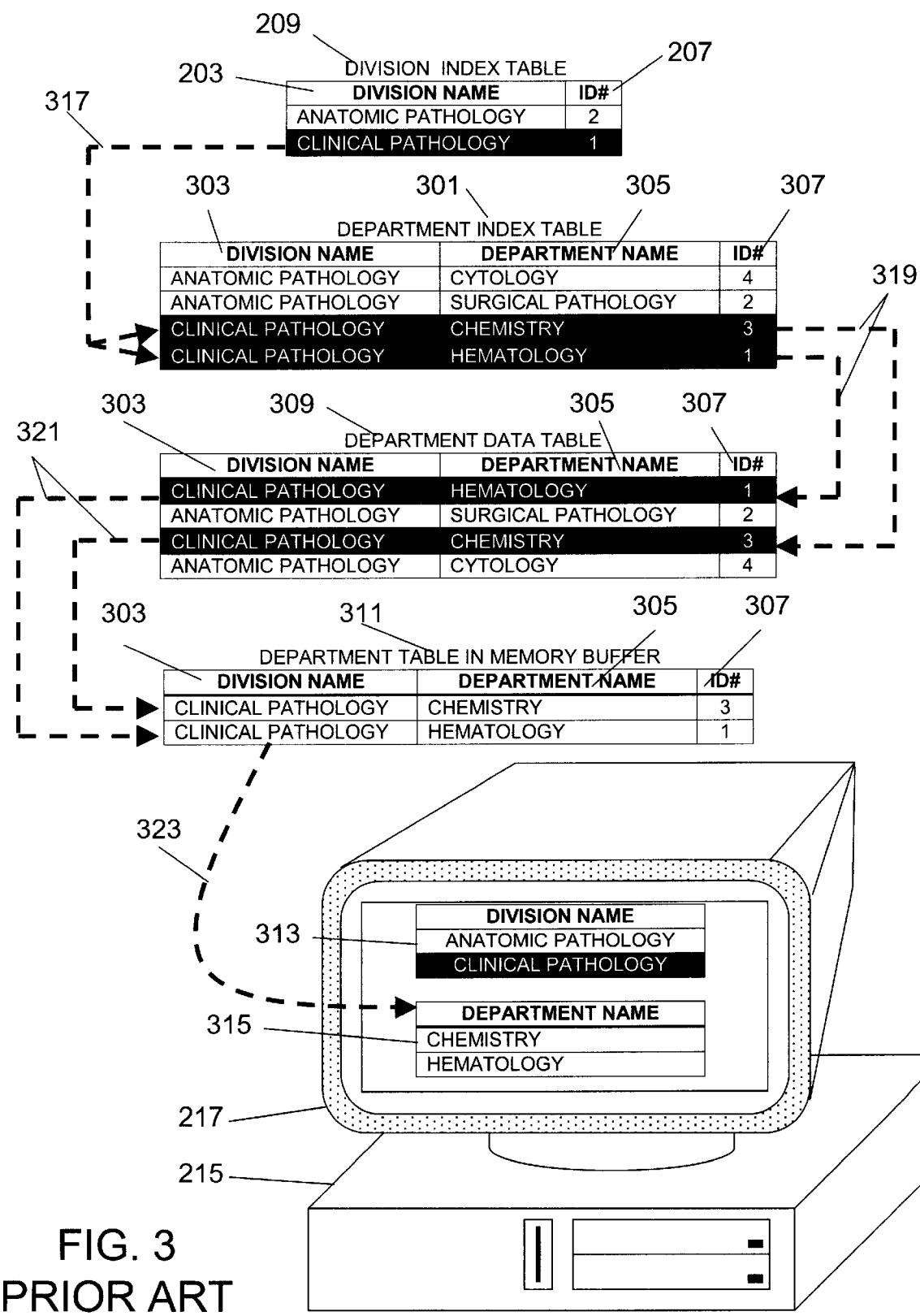
FIG. 3 is a partial view of a master table index, a detail data table, a detail index table, a table stored in a memory buffer, and a computer with video monitor illustrating how detail data is filtered by a chosen master record by a relational link on one common field, ordered by its index, and displayed on a computer in accordance with the prior art.

Standard Relational Model for Linking Two Data Tables by a Common Field: FIG. 3

Shown is a partial schematic view of said DIVISIONS index table (209) stored on electronic-based media containing said DIVISION NAME field (203) and said ID# field (207). Records in said index (209) are sorted alphabetically by the contents of said DIVISION NAME field (203).

Shown beneath said index table (209) is a partial schematic view of a DEPARTMENT index table (301) stored on electronic-based media containing a DIVISION NAME field (303), a DEPARTMENT NAME field (305) and an ID# field (307). Said index table (301) records are sorted alphabetically first by said DIVISION NAME field (303) and then said DEPARTMENT NAME field (305). Shown beneath said index table (301) is a partial schematic view of a DEPARTMENT data table (309) stored on electronic-based media containing said DIVISION NAME field (303), said DEPARTMENT NAME field (305) and ID# field (307) and is ordered by said ID# field (307). Beneath said data table (309) is a memory table (311) shown containing the alphabetized listing of two of the four laboratory departments, and other said unspecified data fields (not shown) in the data table (309). Shown beneath said memory table (311) is an orthographic view of said generic computer (215) and video monitor (217) on which is shown a partial view of the alphabetized DIVISION table object (313), and a partial view of the alphabetized DEPARTMENT table object (315).

FIG. 3 herein above illustrates the standard model for linking records between two data tables wherein at least one common field in the record structure of each said table in the relationship contains a set of identical informational items. Said linkage is made between two or more data tables via their respective index tables. Said linkage may be one-to-one wherein said fields in each table define unique index tables and therefore only one record in the master table may be linked to only one record in the detail table. Said linkage may be one-to-many wherein said detail table index is constructed from one none unique field or at least two fields containing unique values whereby a plurality of detail records may contain the same value in the first field, the index made unique by the addition of the second field of said index. Many-to-one links may be made as well using this relational model.

In FIG. 3, the relationship illustrated is a one-to-many link whereby the highlighted record in said DIVISION index table (209) (shown intaglio white-on-black) contains "CLINICAL PATHOLOGY" as an entry in the DIVISION NAME field (203) and said DEPARTMENT index table (301) contains the same value in two records that are made unique in the index by the "CHEMISTRY" and "HEMATOLOGY" values in the second index field (305). The link is signified by the dashed line (317) pointing from the highlighted field in said DIVISION index table (209) and pointing to the two highlighted records in said DEPARTMENT index table (301). Said index fields point (319) to said data table (311) records by their ID# field (307) values and all or a part of said data records are copied (321) into said memory table where it is ordered by said index table (301) and then written to said user interface on said video monitor (217) where the "CLINICAL PATHOLOGY" record is shown highlighted in said DIVISION table object (313) and the two records linked to it in said DEPARTMENT data table (309) are displayed beneath it in a DEPARTMENT table object (315). Because of space limitations and in an effort to avoid clutter, unspecified data fields defined herein above in FIG. 2 are not shown herein below but implied. If the user where to choose the record containing the "ANATOMIC PATHOLOGY" value in said table object (313) then, by a programmatic procedure, said memory table would be cleared and records containing the "CYTOLOGY" and "SURGICAL PATHOLOGY" values stored in said DEPARTMENT data table (309) DEPARTMENT NAME field (305) would be copied into said memory table and then displayed in said user interface. By this indexing system and linking methodology data records related to each other in separate tables may be viewed together in the user interface without significant effort on the part of the user.

Figure 4:
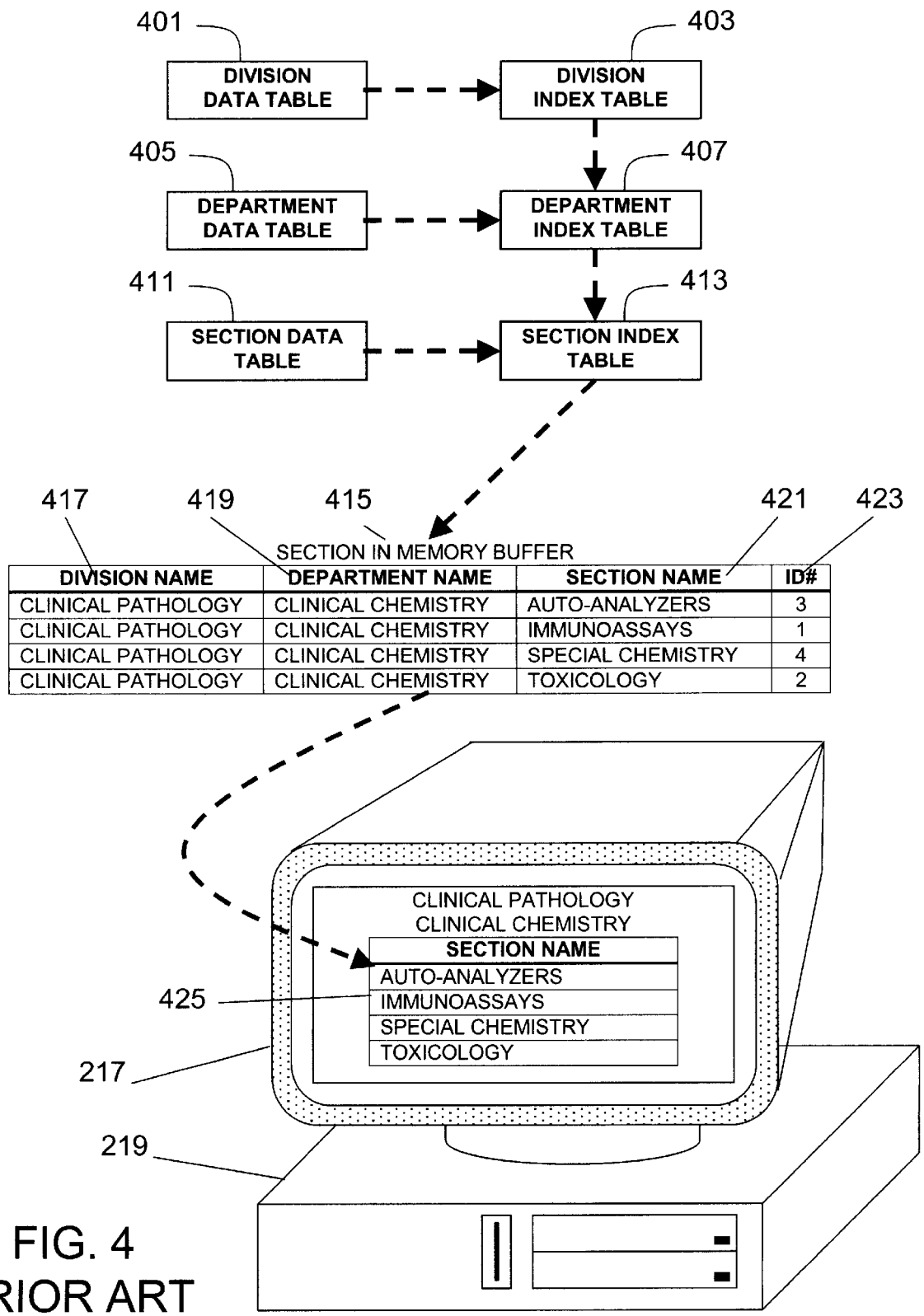
FIG. 4 is a schematic view of a master index table, a first detail data table, a first detail index table, a second detail data table, a second detail index table, a table stored in a memory buffer containing records of said second detail data table, and a computer with video monitor illustrating how a hierarchy of master-detail relations is structured through a plurality of common data fields in each data table and how data from the last detail table in the hierarchy may be displayed on a computer in accordance with the prior art.

The Extension of a Two Level Hierarchy of Linked Tables to a Three Level Hierarchy: FIG. 4

Shown are schematic representations of three data tables and an index table for each data table linked together in a three-tiered one-to-many hierarchy. Said DIVISION data table (401) is linked to said DEPARTMENT data table (405) via said DIVISION index table (403) and said DEPARTMENT index table (407). Said DEPARTMENT data table (405) is, in turn, linked to a SECTION data table (409) via its index table (407) and said SECTION index table (411) contains a three field index built on DIVISION (417), DEPARTMENT (419), and SECTION (421) fields. Shown beneath is a SECTION memory table (413) with four records linked to the "CLINICAL CHEMISTRY" value in said DEPARTMENT data table (309) and containing said DIVISION NAME field (415), said DEPARTMENT NAME field (417), said SECTION NAME field (419), and said ID# field (421). The contents of said memory table (413) are displayed on said video monitor (217) in a table object (423) in said user interface.

Figure 5:
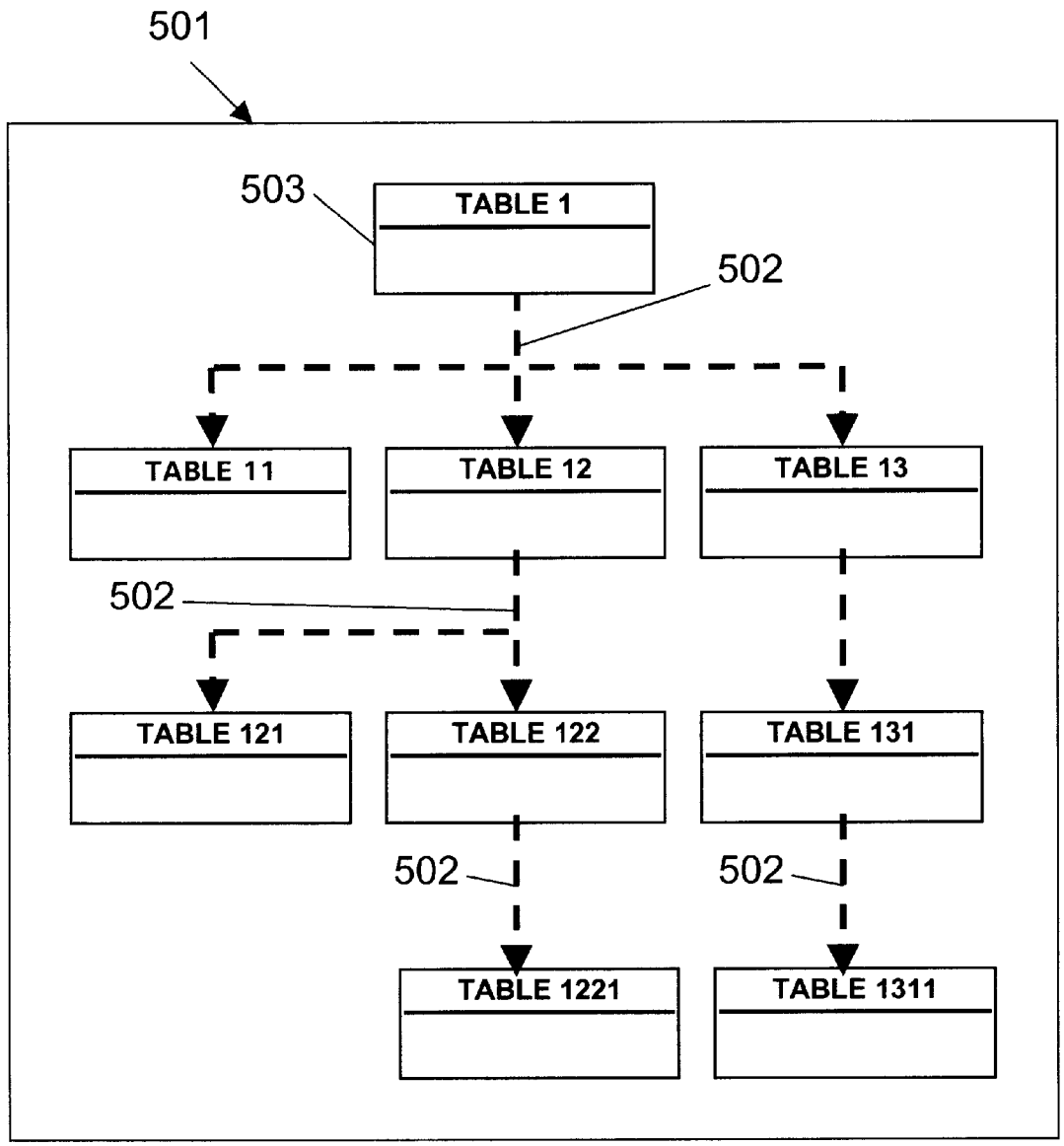
FIG. 5 is a schematic view of a plurality of table files illustrating how a one-to-many data hierarchy is structured in accordance with the prior art.

General One-to-Many Top-Down Hierarchical Structure Provided by Prior Art: FIG. 5.

Illustrated is a schematic view (501) of nine data tables organized to show a top-down, down, hierarchy of master-detail, one-to-many relationships indicated by the dashed lines (502). Each detail table of the first master table (503) is, in turn, a master table for those that are positioned below and so on to the last said table in said hierarchy.

Direct Linking and its Limitations

As shown herein above, prior art utilizes direct linking between any two tables via one or more identical fields contained within their respective index tables. Although effective and efficient for structuring a small number of hierarchical relations between a small number of tables, said approach imposes limits on expanding the number of tables and links between said tables.

Referential Integrity

Maintaining the integrity of the links between any two records across several tables requires a large amount of data storage and computing overhead since linking information is not stored centrally. As complex links are built up using multiple linking fields, this problem is exacerbated. Another limitation of this type is that, if the user decides to or needs to change the data in a linking field at or near the top of the hierarchy, the link to detail records will be broken unless the program is capable of automatically making the change in the detail records to maintain that link. This adds a large amount of processing overhead and the increased potential for corruption of the data and linking of the database when used on a large network. A manual method of making these changes is out of the question, especially where there may be thousands of records linked together. Finally, random corruption of data in a linking field somewhere in the structure can wreak havoc on the integrity of the rest of the data structure.

Internal Link Fields and Auxiliary Index Tables

Although direct linking does not require storing any of the linking data in the master table records, it does require that the detail record contain at least one linking field. When a hierarchy of data tables is built up on a series of subheadings, the use of these subheadings as linking fields increases the size of the auxiliary index tables since, at each level an additional field is added to the sorting sequence of each index used to accommodate a link to a master table further up the hierarchy. Although this may be solved by using a separate unique alphanumeric field, said field must still be added to each index table.

Limits on the Complexity of Linking

Although using a single unique field in each data table works well for a simple master—detail one-to-many data model, the use of direct linking between data tables requires the addition of at least one linking field to each detail table for each relation defined with a master table. Therefore, once a more complex, nonhierarchical structure is contemplated, the data storage and processing overhead balloons. For example if one table is linked to four other tables in a detail—master one-to-one relationship, four linking fields would have to be defined and maintained for that table. In addition, four separate index tables would also have to be created and maintained, one for each link. Therefore, if each table in said data set is linked to the other four said data tables, then twenty index tables would be necessary.

Limits on the Flexibility of the Data Structure

Given the above said five table data set, if it were necessary to add a sixth data table and link it to the previous five, prior art relational models would require a complete redesign including the addition of another link field in all five above said data tables and the addition of ten more index tables. This type of structural change requires a redesign of the user interface and program procedures used to access and manipulate the data. The costs are enormous and the threat to the referential integrity of previously established links is great.

Limits on Combining Data From Separate Tables Into Table Objects

Often, the user wishes to collate a subset of linked data from a set of data tables for viewing, analysis, and reporting. This is done through building a sequential query on the data tables, extracting said linked data and collapsing it into a single, flat file, summary table. This powerful analytic methodology is still limited by the direct linking system wherein the data needed to execute the query is distributed over many data tables and index tables.

Presented herein below is an embodiment of the present invention which provides a unique record identification system and centralized, indirect linking methodology that overcomes the above said limitations of prior art as well as others not so stated.

Universal Record Indexing System and Linking Methodology

In an embodiment of the present invention an indexing system is described that assigns each record in each of a plurality of data tables in a data set an alphanumeric indicum that is unique for all records stored in said data set. Said unique alphanumeric indicum is used to order said records in each said data table such that said data table acts as its own primary index. In addition, said unique alphanumeric indicum are utilized exclusively as the means to link any one record with a plurality of records stored elsewhere in said data set via a separate linking table or tables. Said system allows for the development of methodology that provides a more powerful and flexible linking model. Complex, nonhierarchical, nonlinear, and recursive linking is supported in said model. When combined with a registry table and a plurality of central linking table indexes a plurality of new tables of informational items may be added to a data set without requiring a labor intensive restructuring of said data set, the addition of new index tables for each data table already registered in said data set, or the addition of new linking fields within said record structure of each said table.

Definition of a Table Registry That Provides Domains for Generating Unique Record Indicia: FIG. 6

Figure 7:
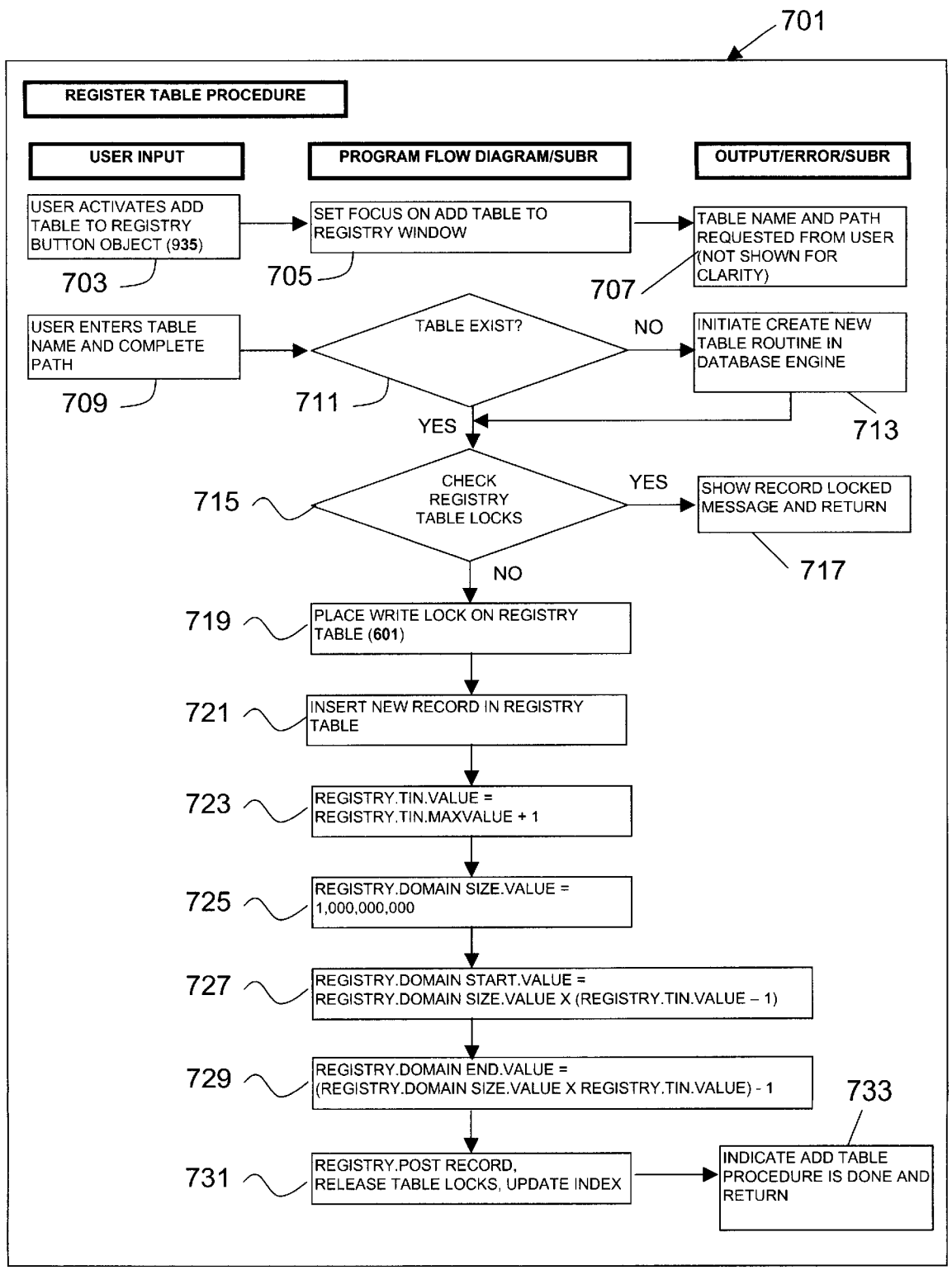
FIG. 7 is a flow chart showing the key programmatic steps to register a data table in the registry to and create a domain of unique record identification numbers for assignment to each record in the new table in accordance with an embodiment of the present invention.

In an embodiment of the present invention, shown are partial schematic views of five data tables. The first table (601) is a table registry herein after also referred to as the registry. Said registry (601) contains a TIN field (603) for storing a unique alphanumeric indicum, a TABLE NAME field (605) for storing data table file name and location, a DOMAIN SIZE field (607) for storing a numeric entry defining the maximum number of records that may be stored in said data table, a DOMAIN START field (609) for storing the first of most recently assigned alphanumeric indicum value in said domain, and a DOMAIN END field (611) for storing the maximum indicum value that may be assigned to a record stored in said data table. In addition, said registry (601) contains a CLTF field (613) for temporarily storing an array of record identification values, a CLTB field (615) for temporarily storing an array of record identification values, and a LINK field (617) for storing data indicating a master table link in said data set. Said registry (601) is shown containing N records the first three of which are shown containing field entries. Shown below said registry (601) is a first data table (619) in said data set called "TABLE 1". Said data table (619) contains a plurality of unspecified data fields (621) with entries indicated by the word "DATA". Said data table (619) also contains an L# field (623) for storing one of an ordered sequence of unique record indicum generated from said domain start column (609) located in said registry (601). Shown below TABLE 1 (619) is a second data table (625) in said data set called "TABLE 2". Said data table (625) contains a plurality of unspecified data fields (627) with entries indicated by the word "DATA". Said data table (625) also contains an L# field (629) for storing one of an ordered sequence of unique record indicum generated from said domain start column (609) located in said registry (601). Shown below TABLE 2 (625) is a third data table (631) in said data set called "TABLE 3". Said data table (631) contains a plurality of unspecified data fields (633) with entries indicated by the word "DATA". Said data table (631) also contains an L# field (635) for storing one of an ordered sequence of unique record indicum generated from said domain start column (609) located in said registry (601). Said third data table (631) is followed by three dots (637) representing an ellipsis to represent an unspecified number of additional tables registered in said data set. Beneath said ellipsis (637) is an Nth data table (639) that contains a plurality of unspecified data fields (641) with entries indicated by the word "DATA". Said data table (639) also contains an L# field (643) for storing one of an ordered sequence of unique record indicum generated from said domain start column (609) located in said registry (601). Said L# fields (621,627,633, and 641) that store unique record identifiers are herein below also referred to as linking fields Defining the Table Registration Procedure: FIG. 7

In an embodiment of the present invention, shown is a procedure (701) consisting of a plurality of programmatic instructions initiated by the user activating (703) the ADD button object (935) in the user interface which initiates the presentation of an ADD TABLE TO REGISTRY window (705) (not shown) whereby the user is queried for the name and location of a table to be registered (707). Upon user entry (709) said procedure (701) checks to confirm the existence of said entered table (711). If said table does not exist said program accesses a database engine to provide the user with the means to create said table (713). If said table does exist then said procedure (701) checks for any locks (715) on said registry table (601). If there are locks the user is informed and said procedure (701) returns control to the main program (717). If there are no locks a write lock (719) is placed on said registry table (601). A new record is inserted (721) into said registry table (601). All records in said registry (601) are scanned for the maximum value of the TIN field (603) entries and one (1) is added to the result and then said incremented value is assigned to said TIN field (603) of said new record (723). Said registry DOMAIN SIZE field (607) is assigned the value 1,000,000,000 (725). Then said registry DOMAIN START field (609) is assigned a first identification number in said assigned domain (727) and said registry DOMAIN END field (611) is assigned the maximum identification number in said assigned domain (729). Said new record is posted, indexes updated and table locks released (731). Finally the user is informed that said procedure (701) is successfully completed and control is returned to said program (733). By said procedure a system for assigning a unique record indicium is established. Although the present embodiment of the invention defines a constant domain size for each table in said registry, a person skilled in the art will see that each table in said registry may be assigned a different sized domain either through the use of an alternate equation or by manually entering a value into said DOMAIN SIZE field (607). In addition alphanumeric values may be used with or in lieu of the numeric values shown. As long as each domain start and end values do not create an overlapping set of record identification numbers, all of the unique capabilities defined by the present invention will be available to the user. Furthermore, said registry table (601) may be registered in itself so as to create a domain for assigning said unique table identification numbers for storage in said TIN field (603).

The above said table registry (601) and registration procedure (701) provides the means to create a Unique Record Identification System herein after referred to as the URIS. The procedure by which a unique record identification number is assigned to a record in the data set is defined herein below by steps (1411) through (1423) in the INSERT RECORD Procedure (1401). Generating a unique alphanumeric indicium for each record across all tables in the data set provides a large number of advantages. First, most relational database systems utilize a unique record indicium within each table so that compatibility of the data structure may be maintained for all previously defined database procedures. This means that introducing new features and capabilities made possible by the present invention does not require giving up legacy software or the significant restructuring of data tables other than to add said linking field to each said legacy table, register said legacy table in said data set and assign a new, unique record indicium to each legacy record.

Direct Linking

Once the data set is organized to provide said unique record identification indicia, a large number of options become available to structure relational links between records stored in tables included in said data set while maintaining direct linking provided for in the original relational model described herein above. Although not shown, a person skilled in the art will see that a single record indicium unique within any table may be substituted for heading fields used herein above to link the division data table (201), department data table (309), and section data table (409) as shown in FIGS. 2, 3, and 4.

Indirect Linking System and the Central Linking Table System [CLTS]

However, the real power of the table registry concept and URIS is not achieved until the actual link is removed from within each record and located in a separate set of specialized linking tables. Placement of said links into said linking tables creates an indirect linking system. When implemented, indirect linking allows the user to link any record or records in said plurality of data tables registered in said data set in a very flexible and powerful manner. In addition, because of the added power of computers to automatically sort, locate, filter, and link records, this unique system can be leveraged into a sophisticated, open ended data structure which does not depend on a rigid data dictionary, eliminates the need to redesign the entire data organization when future needs change the structural requirements, and provides the means to relate one copy of a specific entry to an unlimited number of other records to form multiple relational views and thus create the type of associative memory model.

Defining the Central Linking Table System [CLTS]: FIG. 8

The center piece of the indirect linking system is the Central Linking Table System herein below also referred to as the CLTS. At its simplest the CLTS is a set of two virtually identical data tables that act as two complementary index tables, each with two fields defining the record structure. Each said field stores an indicium from a record in a data table. Since the URIS generates unique record indicia that are calculated from a table identification value, each said record indicium may be decoded to yield the table of origin of each said record. This capability removes the requirement of storing additional information about the table of origin, field type, or link type for said indicium stored in the CLTS.

In an embodiment of the present invention, shown is a CLTF index table (801) which stands for Central Linking Table Forward with a first field (803) labeled L1# and a second field (805) labeled L2#. Said L1# field (803) stores the record number of a first record referred to as the master record herein below and said L2# field (805) stores the record number of a second record referred to as the detail record herein below. Said CLTF index (801) records are ordered in ascending alphanumeric order, first on said L1# field (803) and then on said L2# field (805). Shown below said CLTF (801) is a CLTB (807) which stands for Central Linking Table Backward with said first field (803) labeled L1# and said second field (805) labeled L2#. Said L1# field (803) stores the master record number and said L2# field (805) stores the detail record. Said CLTB index (807) records are ordered in ascending alphanumeric order, first on said L2# field (805) and then on said L1# field (803). Each said central linking table (801, 807) contains an identical number of records, 10 being shown for illustrative purposes, and identical field entry pairs for each said record. The only difference between the two said indexes is the sort order of the two said fields are switched with L1#–L2# for said CLTF and L2#–L1# for said CLTB. Together, said CLTS and said URIS provide a means to create and maintain a bi-directional symmetry so that any master-detail link maintained via said CLTF (801) is also maintained as a detail-master link pointing back in the opposite direction via said CLTB (807). Said L1# field (803) and said L2# field (805) are herein below referred to as indirect linking fields. Herein below are two figures illustrating this bi-directional capability and points out how said embodiment of the invention provides backwardly compatible one-to-many and many-to-one relationships between tables in a data set.

Figure 9:
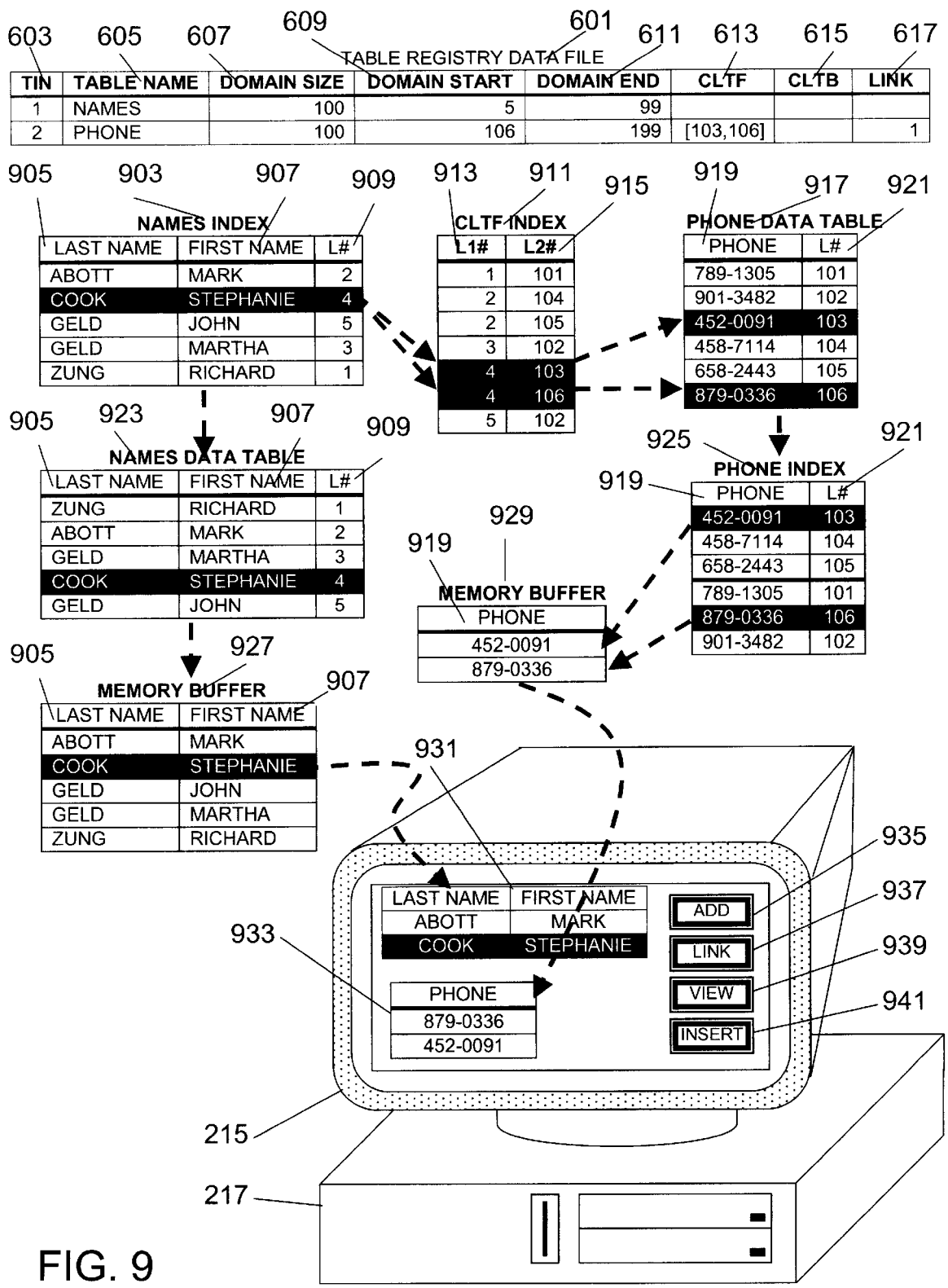
FIG. 9 is a partial view of a plurality of data tables, index tables, memory tables, and computer with video monitor to illustrate indirect linking and the backward compatible with prior art relational models in accordance with an embodiment of the present invention.

Defining Indirect Record Linking Between Two Data Tables Using the CLTF Index: FIG. 9

In an embodiment of the present invention, shown are partial schematic views of a set of ten tables. The first table (601) is said registry containing two records defining a NAMES data table and PHONE data table with their respective domain information. Shown below and to the left is the NAMES index table (903) with LAST NAME field (905), FIRST NAME field (907), and L# field (909). Five records are shown in said data table (903). To the right of said NAMES Index table (903) is a CLTF index table (911) with L1# field (913) and L2# field (915) with each said field containing a record indicum. To the right of said CLTF index table (911) is the PHONE data table (917) with PHONE field (919) and L# field (921). Six records are shown in said PHONE table (917). Shown below said NAMES index table (903) is a NAMES data table (923) and beneath said NAMES data table (923) is a NAMES memory table (927) with each said table sorted as defined herein above in FIG. 2. Beneath said PHONE data table (917) is a PHONE index table (925) and PHONE memory table (929). Shown at the bottom of FIG. 9 are a NAMES table object (931) and PHONE table object (933) displaying a subset of data table records on said video monitor (217). Also shown in the user interface are four button objects labeled "ADD" (935), "LINK" (937), "VIEW" (939), and "INSERT" (841).

The CLTS and URIS work together to allow a user to view linked records in said user interface. As shown in FIG. 9, when a user chooses the "COOK" record in said NAMES table object (931) said MOVE TO RECORD procedure (1201) sets pointers to record number 4 in said NAMES index table (903), said data table (923), and said memory table (927) as indicated by the intaglio white-on-black highlighting. Said CLTF index table (911) is filtered on said L# value in said NAMES index table (903) as indicated by the highlighting of two records containing the value 4 in said L1# field (913). Next said procedure (1201) creates a list or an array containing each value in said L2# field (915) in said filtered set of records. Said PHONE data table (917) may be intersected or otherwise searched to find each L# field (921) value in said linking array. One way illustrated herein below is to decode (1301) each record identification number in the array and to temporarily store each said record identification number in the CLTF (613) or CLTB (615) array field of each decoded table in the registry (601). To illustrate this, two records in said PHONE data table (917) are highlighted and their record identification numbers 103 and 106 are stored in said CLTF field (613) of the PHONE record in said registry table (601). Said stored array values are ordered by said PHONE index table. Records from said data table (917) corresponding to the detail array values are loaded into said PHONE memory table (929) and then displayed in said table object (933) in the user interface. This relational system creates a one-to-many link. The above said embodiment of the present invention is not meant to limit the methodology by which linked records may be displayed and a person skilled in the art will see that other methods may be employed. In addition the indirect linking system may be structured to duplicate the traditional fixed relational link between a master and detail table wherein every record inserted into said detail record is automatically linked to a chosen record in said master table. This is made possible by storing the value 1, representing the record identification for said NAMES data table (923) in said LINK field (617) of record number 2 in said registry (601). A person skilled in the art will be able to create a programmatic procedure that creates a record in said CLTS for every record inserted into said PHONE data table (917) wherein the L# field (909) value in said NAMES data table (923) is stored in the L1# field (913) and the L# field (921) value in said new record in said PHONE data table (917) is stored in said L2# field (915). It will be further evident that a list or array of said master table record identifiers may be stored in said LINK field (617) and a procedural loop added to add a link for each master table represented in said list or array. It will be still further evident that table level locking information may also be stored, accessed, and manipulated in said registry table by adding another field and labeling it LOCK (not shown).

Figure 10:
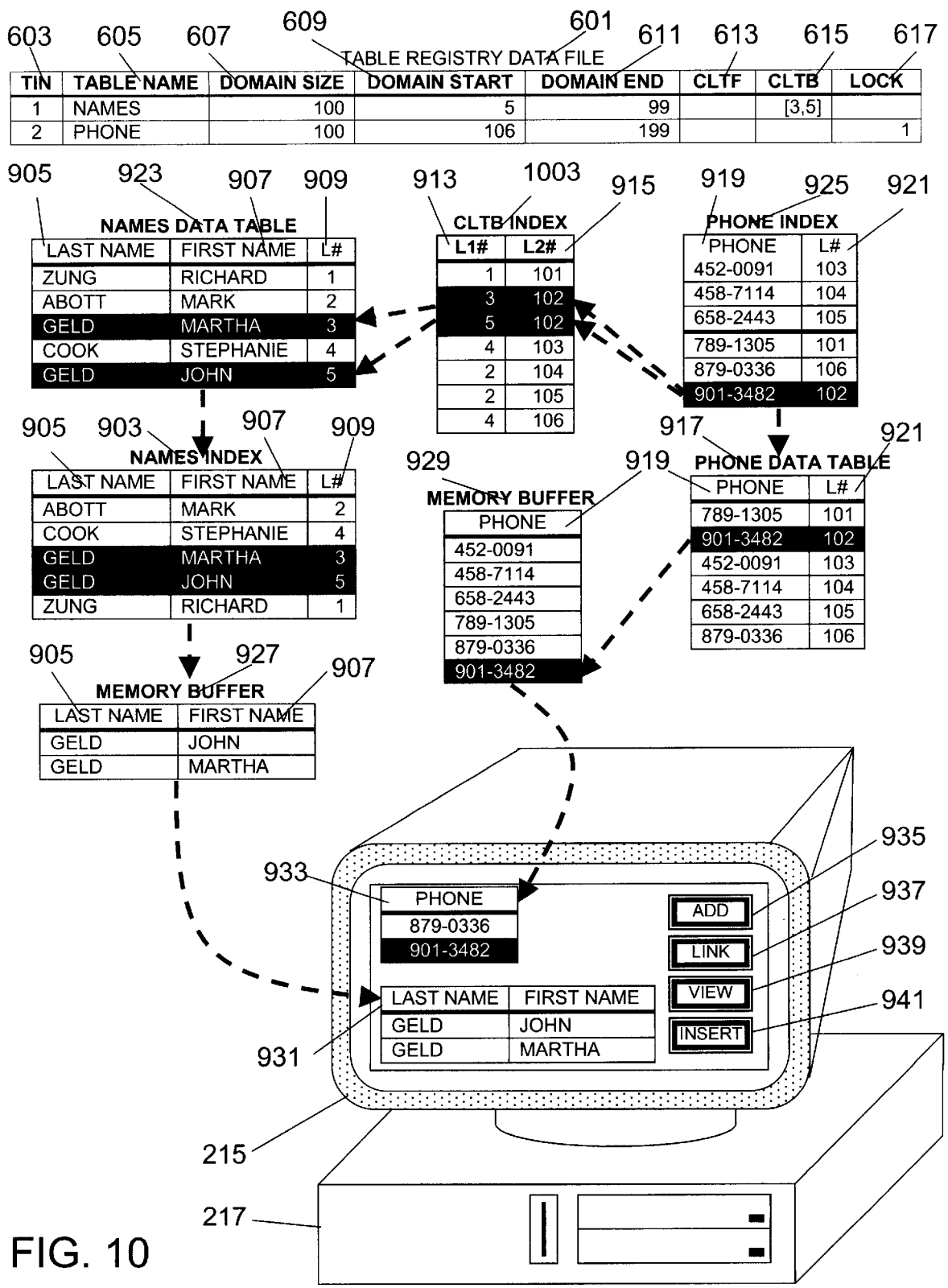
FIG. 10 is a partial view of a plurality of data tables, index tables, memory tables, and computer with video monitor to illustrate how a link created between any two records is automatically bidirectional without the requirement of adding additional relational structures to the data set or significant program code in accordance with an embodiment of the present invention.

Defining Bi-Directionality of the Indirect Record Linking Between Two Data Tables Using the CLTB Index: FIG. 10

In an embodiment of the present invention, shown are partial schematic views of a set of ten tables. Seven said tables correspond exactly to those illustrated in FIG. 9 herein above except for said table's locations in the figure and the presentation of a different set of highlighted records. Said CLTF index table (911) is replaced by a CLTB index table (1003). In addition, the contents of the CLTF (613) and CLTB (615) fields in said registry (601) are different. In this case, said CLTS and said URIS are used in reverse whereby said PHONE index table (925) is used as the master table in the relationship and said NAMES data table (923) is used as the detail table in the relationship. When a user chooses the "901–3482" record in said PHONE table object (933) said MOVE TO RECORD procedure (1201) is called and sets pointers to record number 102 in said PHONE index table (925), said data table (917), and said memory table (929) as indicated by the intaglio white-on-black highlighting. Said CLTB index table (1003) is filtered on said L# value in said PHONE index table (925) as indicated by the highlighting of two records containing the value 102 in said L2# field (915). Next said procedure (1201) creates an array containing each value in said L1# field (913) in said filtered set of records and then decodes (1301) said array of values temporarily storing each in said CLTB field (615) of the registry (601). Said NAMES data table (923) is intersected or otherwise searched to find each L# field (909) value in said linking array. To illustrate this, two records in said NAMES data table (923) are highlighted. Said linking array values are ordered by said NAMES index table and records from said data table (923) corresponding to said detail array values are loaded into said NAMES memory table (927) and then displayed in said table object (931) in said user interface. A many-to-one relational link is also supported in that both Martha Geld and John Geld record entries in said NAMES data table (923) link to a single record in said PHONE data table (921).

To achieve minimal functionality in processing a data set structured using said registry, URIS, and CLTS requires writing a group of software procedures to create a link between two or more records, filter, order, and display linked records in the data set when a new master record is chosen by the user, generate a new unique record identification number when a new record is inserted into a data table, and decode which table an L1# or L2# field value points to in a master-detail relationship. Herein below four figures are presented to illustrate said procedures in pseudocode such that a person skilled in the art may create a working database system using the registry, CLTS and URIS.

Figure 11:
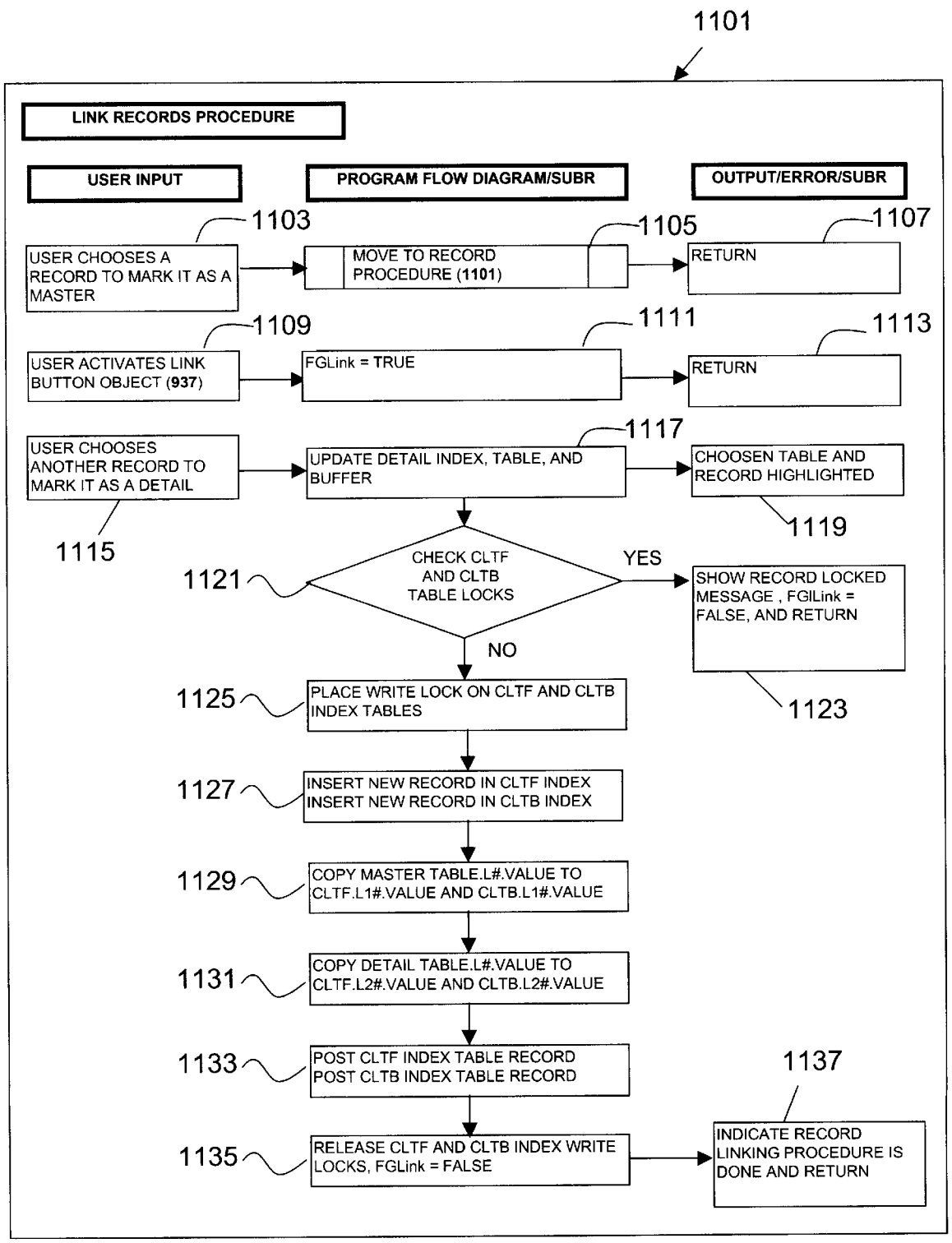
FIG. 11 is a flow chart with pseudocode showing the key programmatic steps to link two records in a data set in accordance with an embodiment of the present invention.

Define the Link Records Procedure: FIG. 11

In an embodiment of the present invention, shown is a procedure (1101) consisting of a plurality of programmatic instructions initiated by the user choosing a record in a table object in said user interface to mark it as the master record in the link (1103). The MOVE TO RECORD procedure (1201) is activated to update the memory buffers and user interface to show previously defined links between records in tables available for viewing and returns control to the program (1107). The user then activates (1109) the LINK button object (937) in the user interface which initiates the LINK RECORDS procedure (1101). This consists of setting a flag called FGlink=True (1111) to inactivate the MOVE TO RECORD procedure (1201) and returns control to the program (1113). The user then chooses another record in the same or another table in the user interface to mark it as a detail record whereupon the procedure (1101) automatically updates said table's index and memory buffer (1117) highlighting said record on screen to show that it is chosen (1119). The procedure checks for locks on the CLTF and CLTB indexes (1121). If there are locks the user is informed and the procedure returns control to the program after resetting the Fglink flag to false (1123). If there are no locks the procedure (1101) places write locks on the CLTF and CLTB index tables (1125) and then inserts a new record in each index (1127). The record identification number stored in the L# field of the master record is copied into the L1# fields of both the CLTF and CLTB index tables (1129). The record identification number stored in the L# field of the detail record is copied into the L2# fields of both the CLTF and CLTB index tables (1131). Both new records are posted (1133). Then the write locks are released and FGlink is set to equal false (1135). Finally, the user is informed that the procedure has been successfully executed and control is returned to the program (1137). A person skilled in the art will see that a duplicate linking pair may be avoided by writing a procedure that searches for the intended record identification pair and prevents the addition to the CLTS.

Figure 12:
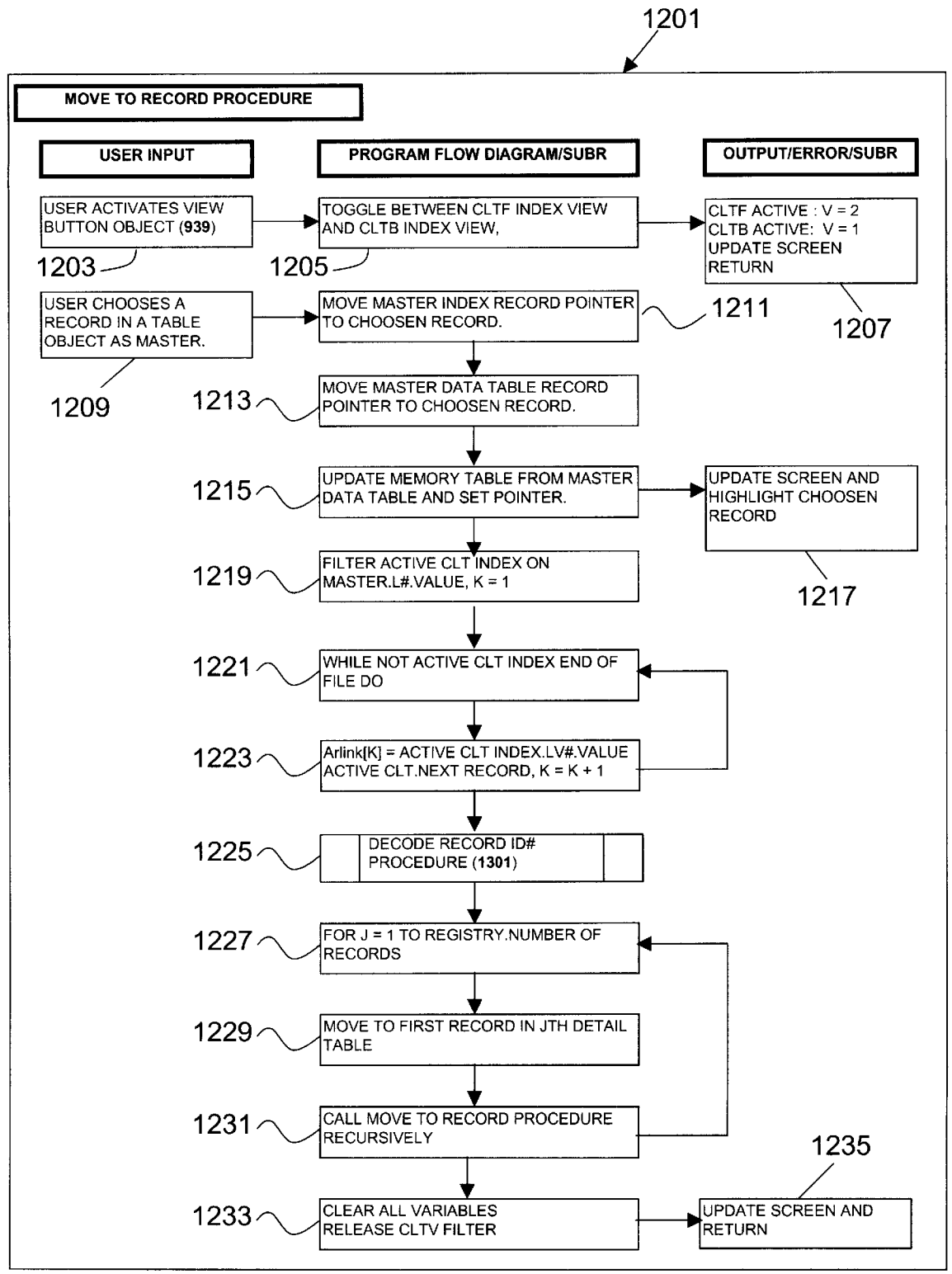
FIG. 12 is a flow chart with pseudocode showing the key programmatic steps to cause a plurality of data tables in a data set to be filtered by any chosen record in a data set in accordance with an embodiment of the present invention.

Define the Move to Record Procedure: FIG. 12

In an embodiment of the present invention, shown is a procedure (1201) consisting of a plurality of programmatic instructions initiated by the user activating (1203) the VIEW button object (939) in the user interface which toggles the program between displaying either the forward linking through the CLTF index or backward linking through the CLTB index (1205). A numeric variable V is assigned the number 1 for CLTF, the number 2 for CLTB, and control is returned to the program (1207). Whenever the user chooses a single record in a table object in the user interface (1209), the main procedural steps are initiated. The record pointer of the index being used to order the records in the data table is moved to the chosen record (1211). The record pointer to the underlying data record is then moved to the corresponding record (1213). The memory table for said data table is updated with data from record fields pointed to in the underlying data table (1215). The record in the user interface is highlighted to indicate it is chosen (1217). The procedure (1201) filters the L1# field in the active CLT index on the record identification number stored in the L# field in the chosen record and initializes an integer variable K=1 (1219). A while loop is activated on the active CLT index table record pointer (1221). A linking array ARLink[K] is assigned the active CLT index L1# value if V=1 and L2# value if V=2 (1223). The DECODE RECORD procedure (1301) is called (1225). A for loop is initiated on the number of records in the registry table (1227) and the pointer for each table linked to in the data set is moved to the first record (1229). The MOVE TO RECORD procedure (1201) then calls itself recursively to process any record links from detail tables to other tables in the data set with the exception of those already in a master relation (1231). Finally said procedure (1201) updates the user interface table objects to display all links in the active CLT index and returns control to the program (1233).

Figure 13:
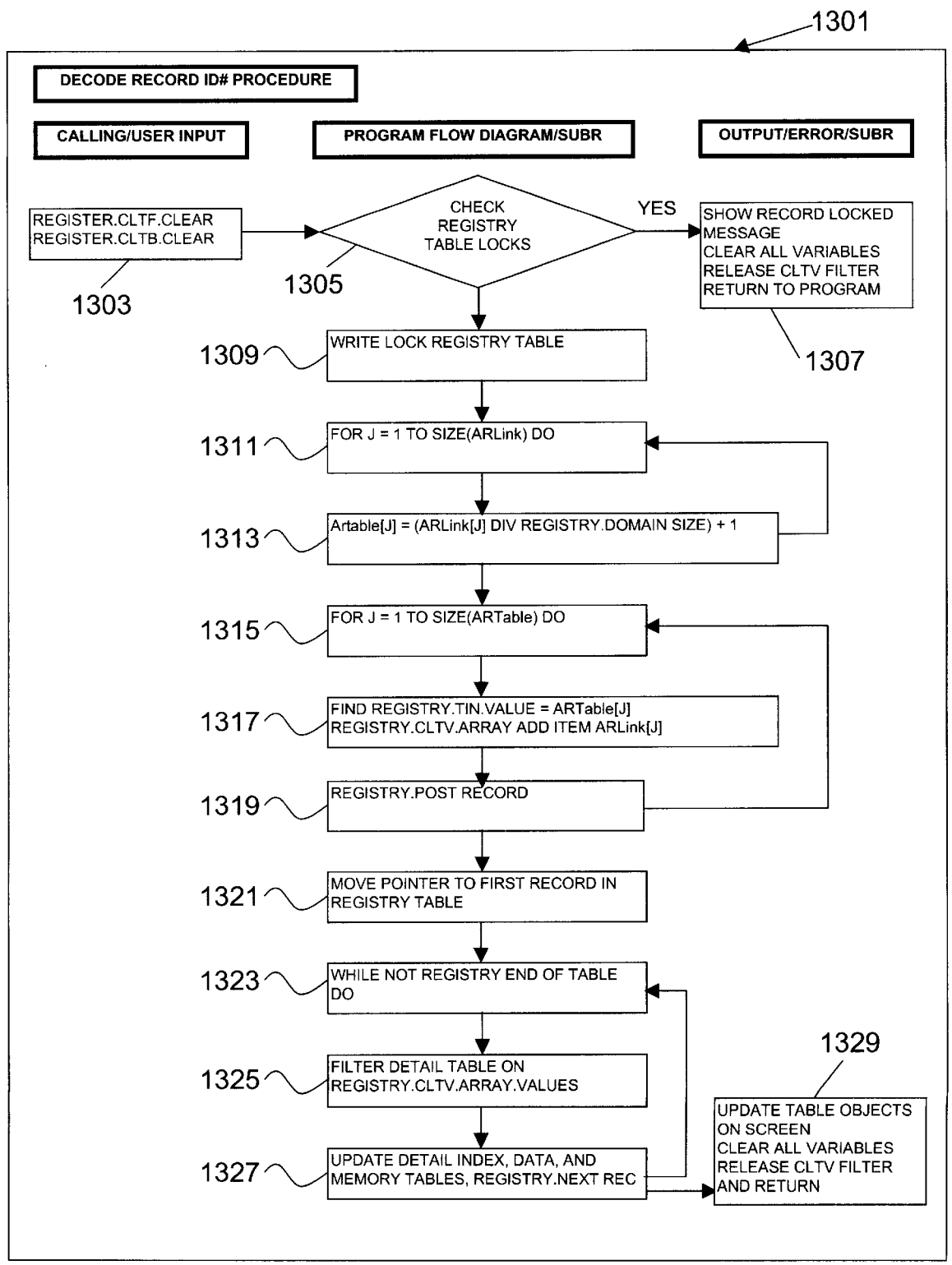
FIG. 13 is a flow chart with pseudocode showing the key programmatic steps to decode a plurality of record identification numbers used in an indirect link to identify each owning record's table and to create temporary alphanumeric arrays to filter and display linked detail tables in a user interface in accordance with an embodiment of the present invention.

Define Decode Record Identification Number Procedure: FIG. 13

In an embodiment of the present invention, shown is a procedure (1301) consisting of a plurality of programmatic instructions initiated by a calling procedure. The calling procedure initiates the clearing of the registry CLTF and CLTB fields (1303). Then a check for locks on the registry table is carried out (1305). If there are locks, the user is informed of said locks, all calling procedural variables are cleared, the CLT filter is released, and control returned to the program (1307). If there are no locks a write lock is placed on the registry table (1309). Then a FOR loop is initiated on the size of the ARLink array (1311) wherein the TIN value of each record indicum is calculated and stored in the ARTable array (1313). When said loop is finished, a second FOR loop is initiated on the size of the size of the ARTable array (1315) wherein the record of each ARTable value is located in the registry table and the appropriate CLTF or CLTB field has the corresponding ARLink array value added (1317). Said record is then posted before the loop continues (1319). Upon completion of said loop the registry pointer is set to the first record (1321). A WHILE loop is initiated on an end of table function for the registry (1323) wherein the table indicated by each record in the registry is filtered on the array of values in said CLTF or CLTB array fields (1325). Then said table indicated in said record in said registry has its data table, index table, and memory table updated before a next record function is called on said registry table (1327). Finally, all effected table objects in the user interface are updated, all variables are cleared, and the CLT filter cleared before control is returned to the calling procedure (1329).

Figure 14:
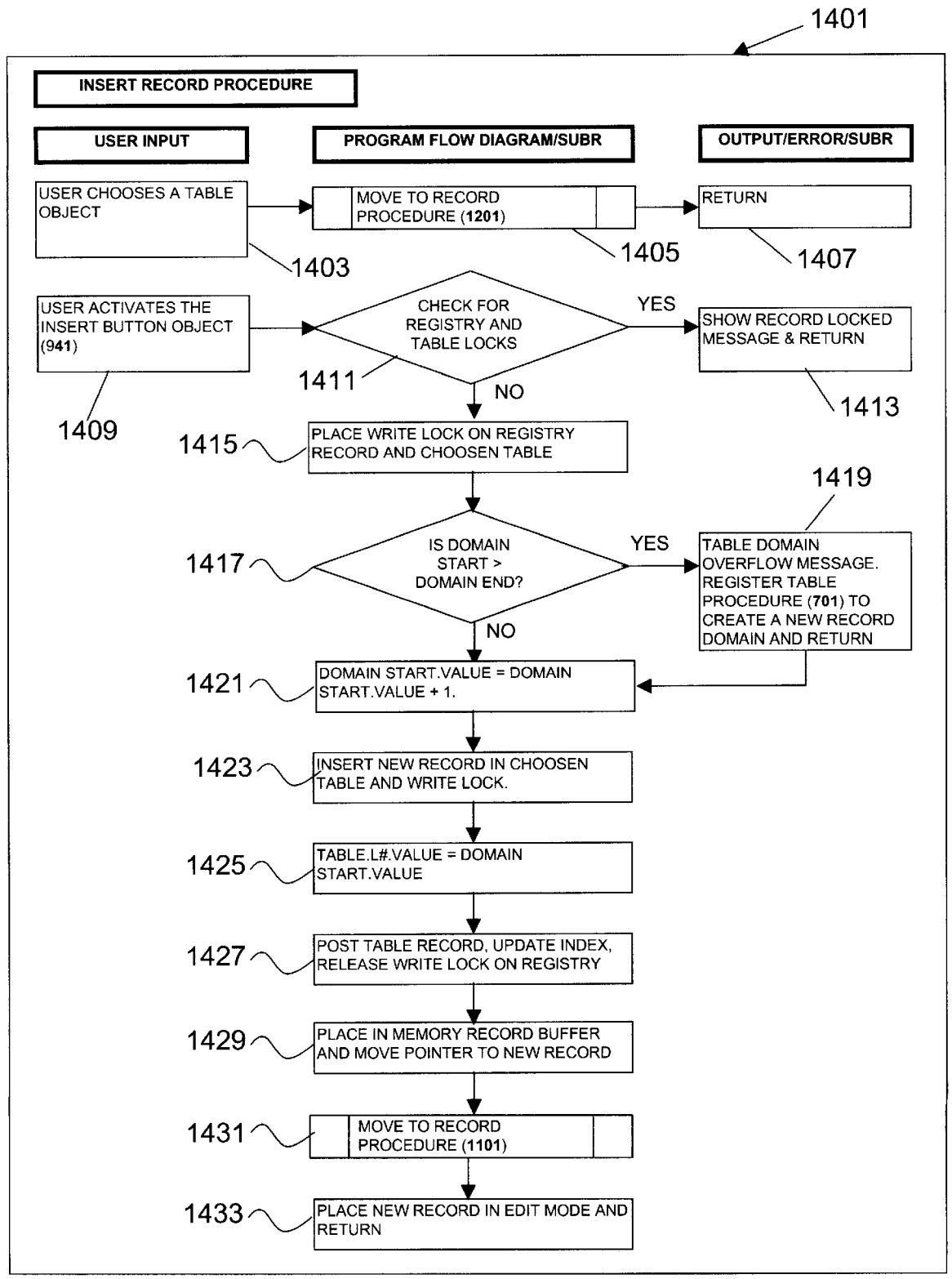
FIG. 14 is a flow chart with pseudocode showing the key programmatic steps to insert a new record into a table in said data set and assign it a unique record indicum such that it may then be used in a linking relationship with any other record or plurality of records in said data set in accordance with an embodiment of the present invention.

Define Insert New Record in a Table Procedure: FIG. 14

In an embodiment of the present invention, shown is a procedure (1401) consisting of a plurality of programmatic instructions initiated by the user choosing a record in a table object in the user interface to mark it (1403). Said MOVE TO RECORD procedure (1201) is activated to update the memory buffers and user interface to show previously defined links between records in tables available for viewing (1405). Said procedure returns control to the program (1407). The user then activates (1409) the INSERT button object (941) in the user interface which initiates the INSERT RECORD procedure (1401). First a check is made for locks on the registry table and the table into which the record is to be inserted (1411). If there are locks the user is informed and the procedure returns control to the program (1413). If there are no locks, then write locks are placed on both the registry record pointed to by the MOVE TO RECORD procedure (1201) and the table into which the record is to be inserted (1415). Next, the DOMAIN START and DOMAIN END values are compared to determine if there is at least one record identification numbers left for assignment. If not, then the REGISTER TABLE procedure (701) is called as a subroutine and entered at step 721 to insert a new registry record for said table and calculation of a new domain for its records (1419). The subroutine then returns control to the INSERT RECORD procedure (1401). The DOMAIN START value is incremented by one (1) (1421), a new record is inserted in the chosen table and write locked (1423), and the L# field of the new record assigned the new DOMAIN START value from the registry record (1425). The table record is posted, the table indexes updated, and the record write lock released on the registry table (1427). The newly inserted record is placed in the memory buffer and the pointers moved to the new record (1329). The MOVE TO RECORD procedure (1201) is called to update all other tables in the data set (1431). The new record is placed in edit mode and control is returned to the program (1433). A person skilled in the art will see that a procedure may be written that checks in Said LINK field (617) of said registry (601) for each master table for said insertion table and automatically create a link to each chosen master record in said master tables by inserting a record in each CLTS index and copying the master record—detail record identifiers into the appropriate indirect linking field.

Figure 15:
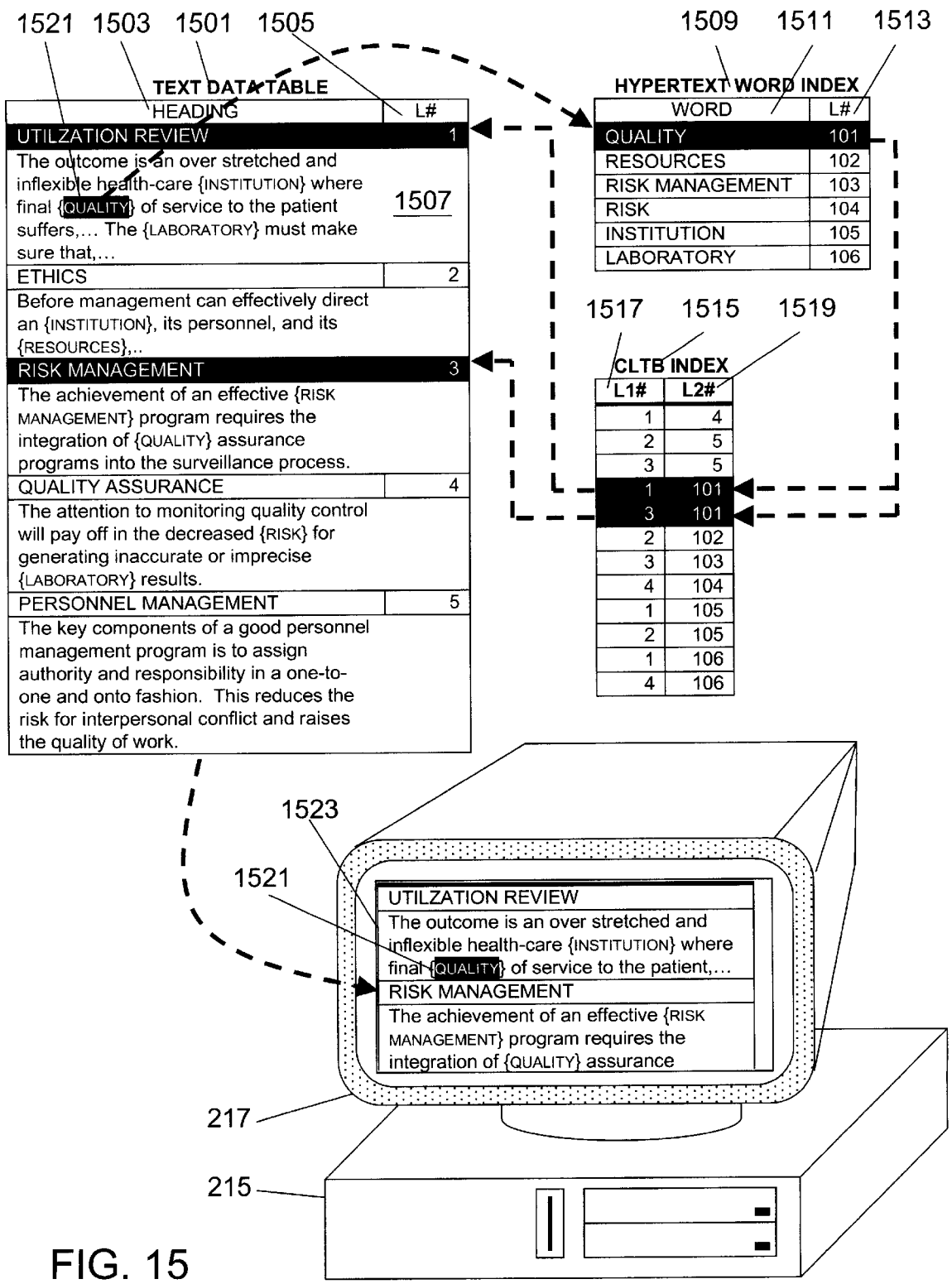
FIG. 15 is a partial view of a data table containing textual information, an index table containing individual words and text fragments, a central linking table index, and a computer with video monitor illustrating how a hypertext data system may be constructed in accordance with an embodiment of the present invention.

Creating a Hypertext Linking System Using the CLTB and an Auxiliary Hypertext Word Index Table: FIG. 15

The capability that indirect linking provides has utility in complex documents containing, textual, numeric data, multimedia, graphic, photographic, video, multidimensional grid, charting, and sound data. These are referred to as hypertext systems. Present hypertext linking systems generally only link from one word, text block, or other object to one other word, text block, or object and often only in one direction. It is often important for a user to be able to link a field, a field value, or portions of a field value bi-directionally to a plurality of other fields, field values, portions of field values and/or entire records and tables of records to produce a truly capable hypertext document. Indirect linking as described in the present invention allows the formation of such an hypertext database structure. A simple example is provided herein below that a person skilled in the art will be able to generalize to include any type of stored data.

In an embodiment of the present invention, shown are partial schematic views of three tables. The first is the TEXT data table (1501) containing a HEADING field (1503), L# field (1505), and TEXT field (1507). The second is the HYPERTEXT WORD index table (1509) containing a WORD field (1511) and L# field (1513). The third table is a CLTB index (1515) table containing an L1# field (1517) and an L2# field (1519). Shown are a number of linked single words or text blocks consisting of a plurality of words indicated by uppercase formatting and brackets "{LINKED WORD(S)}". In particular, the word {QUALITY} (1521) is highlighted in record 1 of said TEXT data table (1501). Said record is linked via the highlighted word (1521) a highlighted record in said HYPERTEXT WORD index table (1509) by the identity of the contents of said WORD field (1511) with the linked word (1521). In turn, said record is linked, via said CLTB index table (1515) back to said TEXT data table (1501). This is also referred to as a recursive or circular link herein below. Said link is shown by two highlighted records in said CLTB index table (1515) that contain record identification numbers in said L2# field (1519) that are identical to that stored in the highlighted record in said HYPERTEXT WORD index table (1509) L# field (1513). Said two highlighted records in said CLTB index table (1515) point to records 1 and 3 in said TEXT data table (1501) and these are displayed in a table object (1523) in the user interface on said video monitor (217). A person skilled in the art will see that said HYPERTEXT WORD index table (1509) may also be used directly in said user interface as an index listing that a user could choose from in order to look up all related data records in said TEXT data table (1501).

Figure 16:
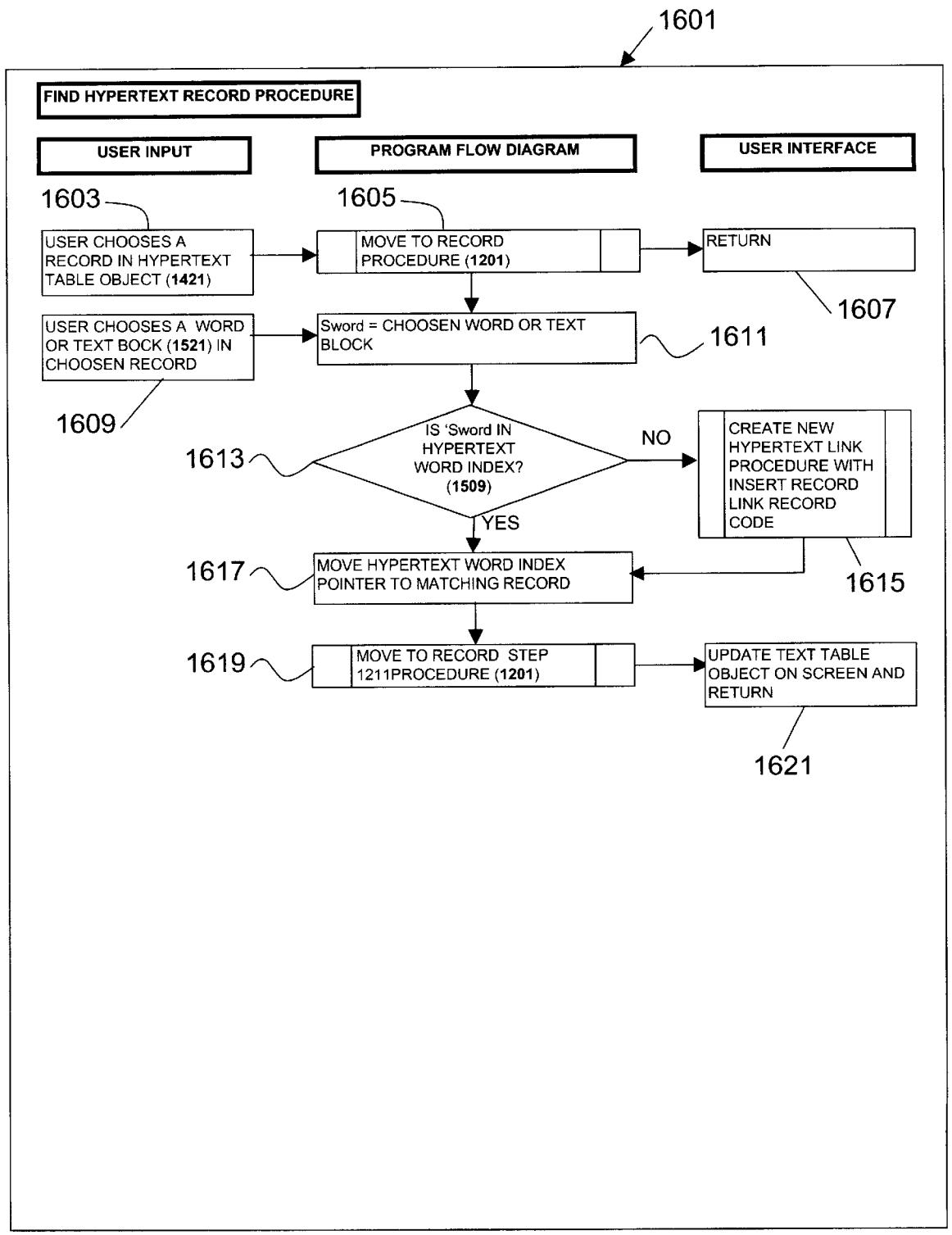
FIG. 16 is a flow chart with pseudocode showing the key programmatic steps to find a plurality of records stored within a single table and linked through a second table via said central linking table in accordance with an embodiment of the present invention.

Find Hypertext Record Procedure: FIG. 16

In an embodiment of the present invention, shown is a procedure (1601) consisting of a plurality of programmatic steps initiated by the user choosing a record in a table object in the user interface to mark it (1603). Said MOVE TO RECORD procedure (1201) is activated to update the memory buffers and user interface to show previously defined links between records in tables available for viewing (1605). Control is then returned to the calling procedure (1607). The user chooses a word or text block in said record (1609) initiating the assignment of the chosen word or text block to a string variable labeled "Sword" (1611). Said HYPERTEXT WORD index table (1509) is searched on the value of Sword (1613). If a matching record is not found in said index table (1509) then said procedure (1601) initiates a subroutine (1615) (flow chart not shown) that provides the user with the option of adding said word or textblock as a new record entry in said HYPERTEXT WORD index table (1509) and to create a link via said entry to another record in said data set reusing said INSERT RECORD procedure (1401) and said LINK RECORDS procedure (1101) code. Said subroutine then returns control to said procedure (1601) at step (1617). If said word or text block is found, then said HYPERTEXT WORD index table (1509) record pointer is moved to said record (1617). At this point, said MOVE TO RECORD procedure (1201) is entered at the (1211) step to update said user interface to show all records linked to said work or text block chosen (1619). Control is returned to the program (1621).

Figure 17:
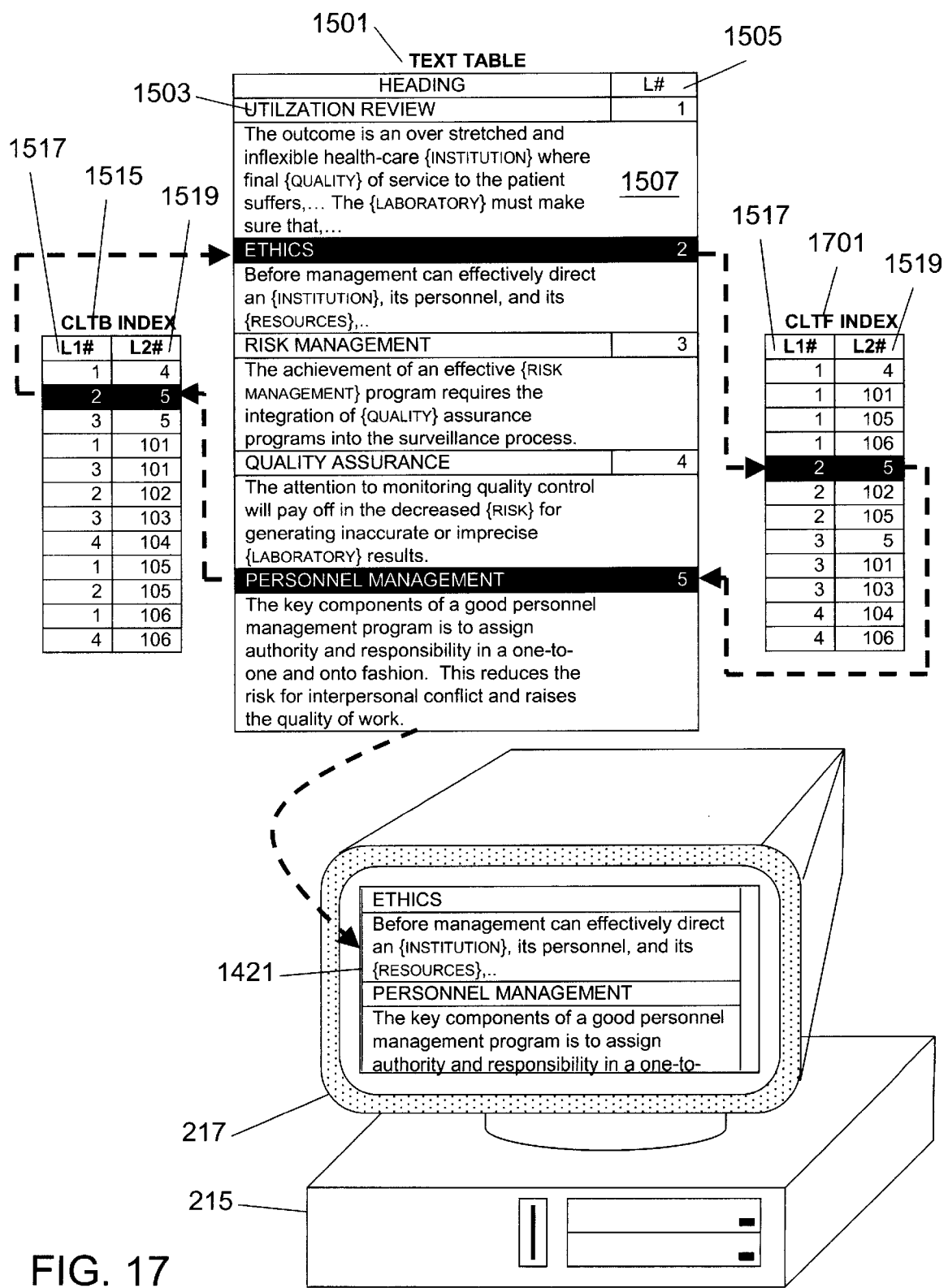
FIG. 17 is a partial view of a table file containing textual data, two complementary central linking table indexes, and a computer with video monitor illustrating how a plurality of records in a single data table may be linked two each other by their own unique record indicum in accordance with an embodiment of the present invention.

Defining Recursive Record Links Using the Hypertext Model as an Example: FIG. 17

A person experienced in the art will see that any data set structured by said registry table, URIS, and CLTS also supports recursive linking between records within the same data table. In an embodiment of the present invention, shown is the same HYPERTEXT data table (1501) with two highlighted records linked bi-directionally to each other by a set of a CLTF (1515) and CLTB (1701) index tables. The resulting linked records are shown displayed in said table object (1523) in said user interface on said video monitor (217).

Figure 18:
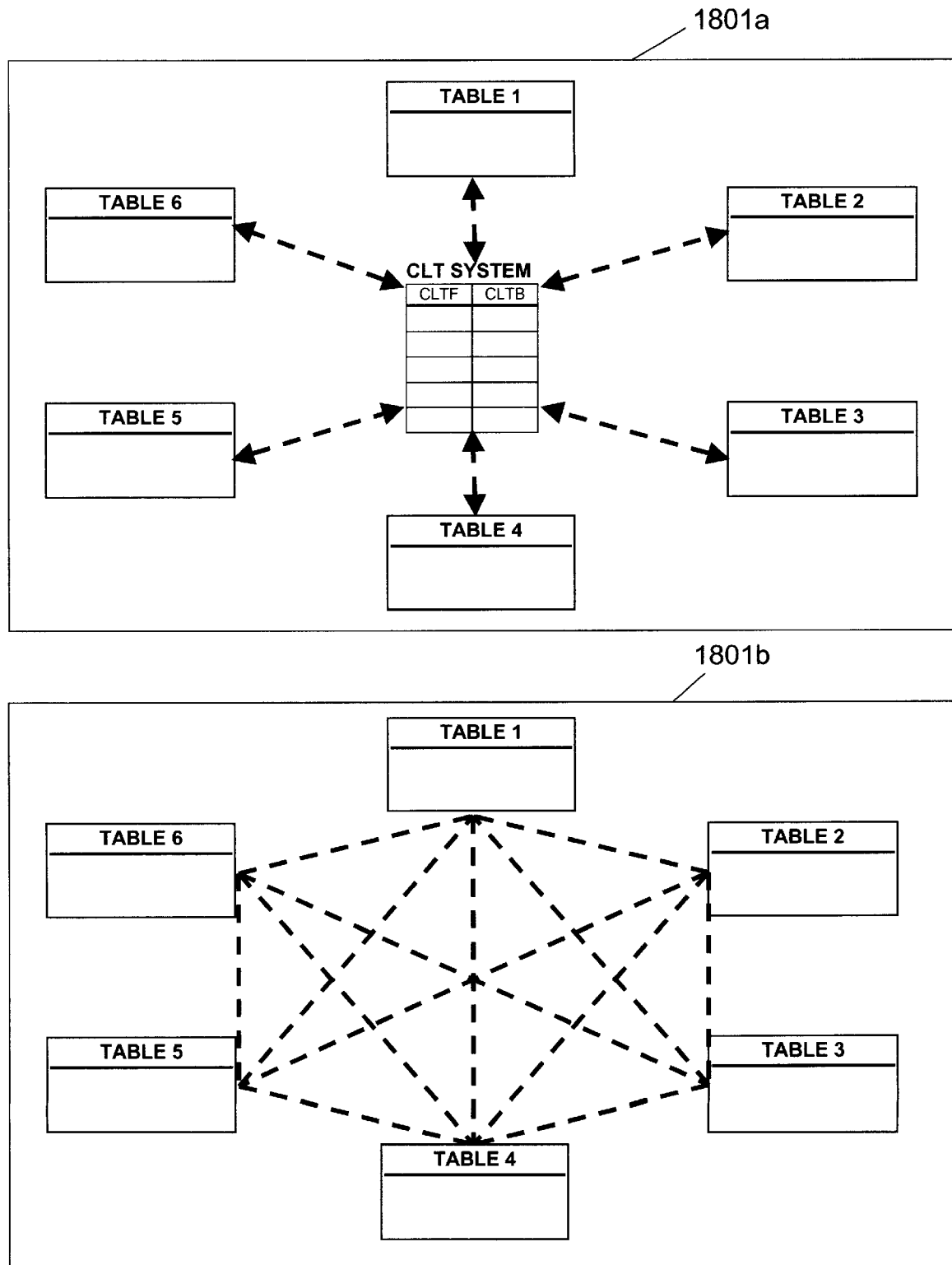
FIG. 18 are two related schematic views of six data tables to illustrate how a plurality of tables may be inter-linked to each other through two complementarily ordered central linking table indexes in accordance with an embodiment of the present invention.

The CLT Providing the Means to Define Multiple Links Between a Plurality of Tables: FIG. 18

In an embodiment of the present invention, shown are two different schematic views of six data tables linked together via a CLTS. The first said view (1801a) shows a bi-directional link between each data table and each of the two complementary indexes of the CLTS showing graphically how said links are structured radially instead of in a top-down one-to-many hierarchy illustrated in FIG. 5 herein above. Said radial structuring of record linking provides the means to efficiently link all six tables to each other as shown herein below in said second view of said six tables (1801b) without having to define more than one linking field and one index table per data table.

Figure 19:
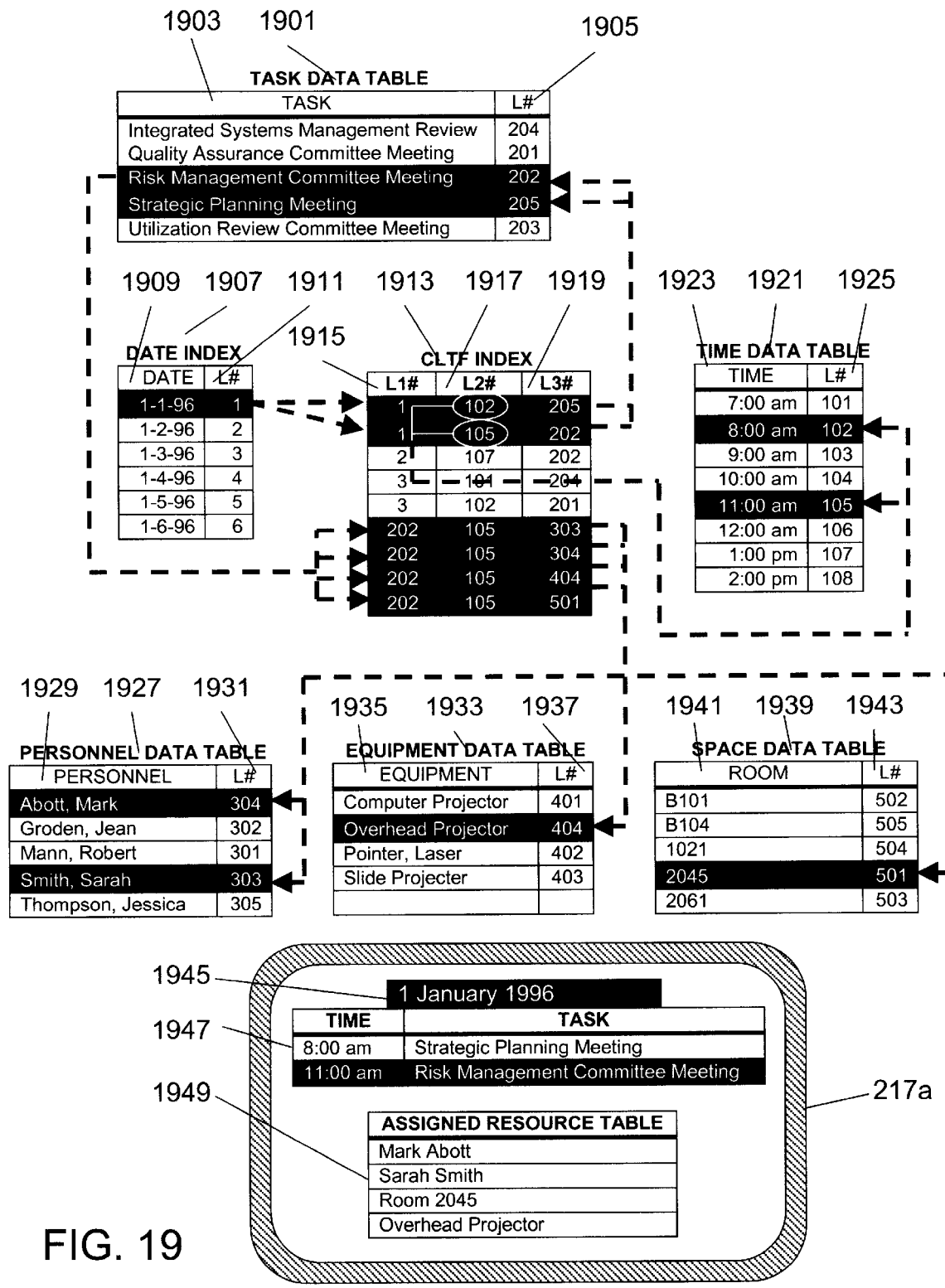
FIG. 19 is a partial view of a plurality of data tables, index tables, memory tables, and computer with video monitor to illustrate how six tables in a data set may be linked and records reused in a linking hierarchy to create a complex compound information system to schedule the use of a plurality of personnel, equipment, and space resources by date and time, to any particular task in accordance with an embodiment of the present invention.

An Hierarchical Resource Management System Made Possible by the CLT Generalized to More Than Two Linking Fields: FIG. 19

In an embodiment of the present invention, shown are ten tables comprising a model resource management system for allocating personnel, equipment, and space resources to a plurality of scheduled tasks. At the top of the figure is a TASK data table (1901) containing a TASK field (1903) and L# field (1905). Below and to the left is a DATE index table (1907) with DATE field (1909) and L# field (1911). To the immediate right of said table is a CLTF index (1913) containing L1# field (1915), L2# field (1917), and L3# field (1919). To the immediate right is a TIME data table (1921) containing a TIME field (1923) and L# field (1925). Below are three more tables. To the left is a PERSONNEL data table (1927) containing a PERSONNEL field (1929) and L# field (1931). To the immediate right of said table is an EQUIPMENT data table (1933) containing an EQUIPMENT field (1935) and L# field (1937). To the immediate right of said table is a SPACE data table (1939) containing a ROOM field (1941) and L# field (1943). Beneath said three tables is a two dimensional view of said video monitor (217a) with three table objects. The first is a DATE table object (1945) the second is a combined TIME and TASK table object (1947), and the third is a combined ASSIGNED RESOURCE table object (1949). To avoid clutter, memory tables are not shown in the figure.

In this case, said resource management system requires that records in said TIME data table (1921) be used more than once as intermediate records in a three-level relational hierarchy of one-to-many links and, additionally requires that resources stored in said three separate resource data tables (1927, 1933, and 1939) be collated into a single resource table object in said user interface. Records in said TIME data table (1921) are reused for each day in said DATE index table (1907) to save storage space on the electronic-based media and to reduce the time of access to time record values. Because of said reuse, a two field CLTS cannot provide the means to avoid unwanted links between records in said DATE index table (1907) and said TASK data table (1901). That is, referential integrity is not maintained by the two field CLTS in this specific case. This problem is easily solved by generalizing said CLTS to three or more linking fields as needed. The illustrated CLTF index (1913) has three linking fields. A person skilled in the art will see that said LINK RECORD (1101), said MOVE TO RECORD (1201), and said DECODE RECORD ID# (1301) procedures may be generalized to an a CLTS with more than two fields by adding appropriate flags, linking arrays, and procedural sub-loops to accommodate said additional indirect linking fields. In addition, when necessary each table in said data set may be assigned its own indirect linking field in said CLTS to reduce processing overhead. Therefore, a ten table data set would utilize a ten field CLTF and ten field CLTB. However, as each new field is added to the CLTS, at least one new index is necessary to efficiently accommodate links through appropriately sorted indexes. To fully accommodate all possible linking relationships for a three table data set, a three field CLTS would be defined where in a total of six (6) index tables would be necessary. In fact, the number for any N tables in a data set would be N! (N factorial). Since this is a power function, the number of indexes rises rapidly. Therefore, only those indices needed to solved any particular relational problem are suggested.

In the above said figure the user chooses record 1 in said DATE table object (1945) which, via a modified form of said MOVE TO RECORD procedure (1201), updates all linked indexes, data tables, memory tables, and display objects. This is shown by record 1 in said DATE index table (1907) pointing to the first two records in said CLTF index table (1913) with matching record identification number values stored in said L1# field (1915). The values stored in said L2# field (1917) point to records 102 and 105 in said TIME data table (1921). The values stored in said L3# field (1919) point to records 202 and 205 in said TASK data table (1901). When the user chooses the 11:00 am task record in said table object (1947) a modified form of said MOVE TO RECORD procedure (1201) updates all linked indexes, data tables, memory tables, and display objects. This is shown by record 202 in said TASK data table (1901) pointing to four records in the CLTF index table (1913) with matching record identification number values stored in said L1# field (1915). Said four records are linked to one of the three said resource tables via stored values in the L3# field (1919), values 303 and 304 pointing to two records in said PERSONNEL data table (1927), value 404 pointing to one record in said EQUIPMENT data table (1933), and value 501 pointing to one record in said SPACE data table (1939). The resulting filtered data records are collated (2101) and displayed in the user interface. The above said figure also illustrates that said TASK data table (1901) record may also be linked back to said TIME data table (1925) via said L2# field (1917) where each entry is 105. A person skilled in the art will immediately see that this allows for cross-indexing resource records with a plurality of tasks to determine or prevent any resource scheduling conflicts. In addition, it will be seen that each said CLTF index table (1913) record define an array of record identification numbers which may be manipulated to create simple groupings or clusters of mutually linked records without defining a master-detail, one-to-many relationship.

Figure 20:
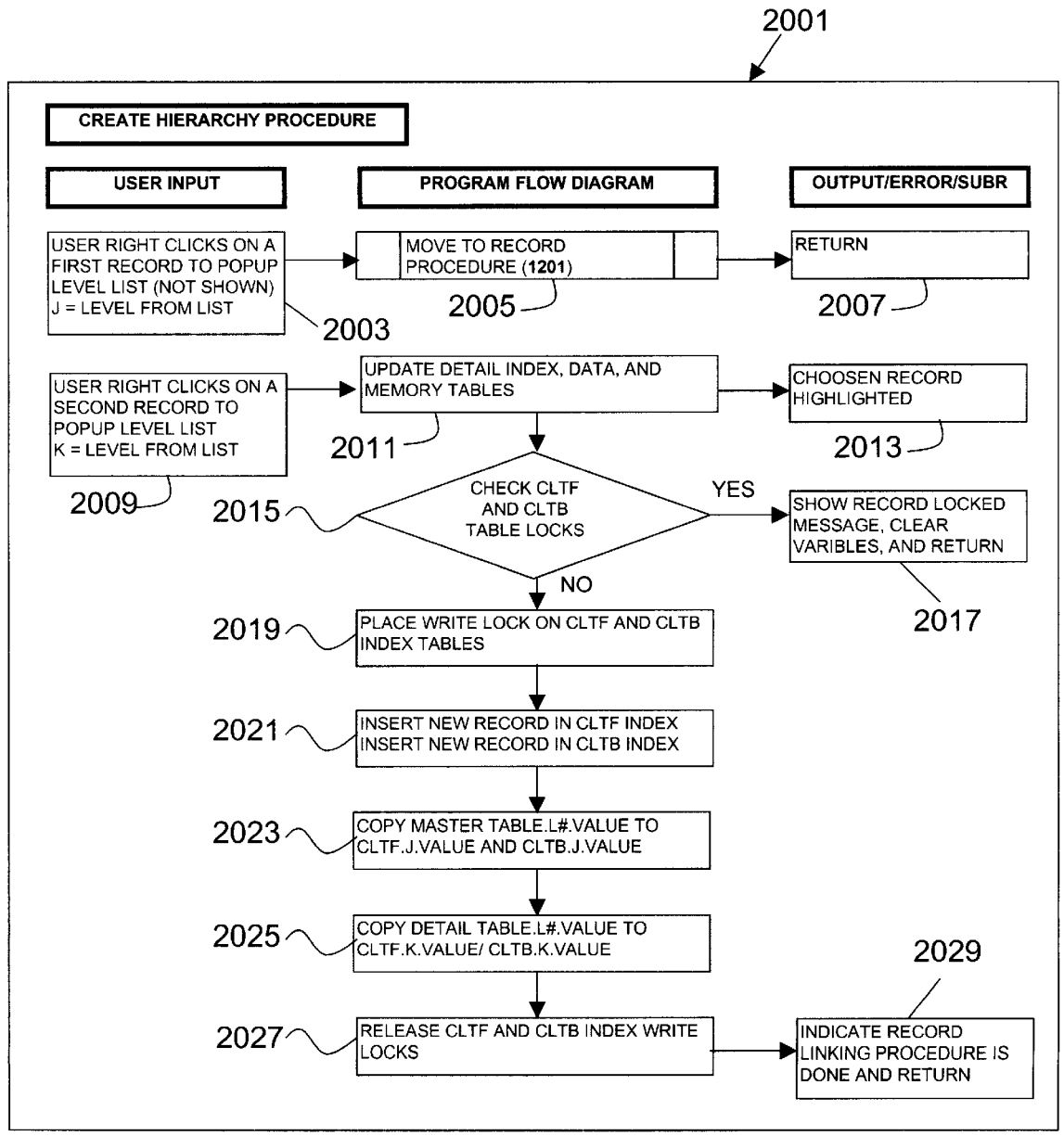
FIG. 20 is a flow chart with pseudocode showing the key programmatic steps to create an hierarchical link between any two tables using a generalized version of the central linking table in accordance with an embodiment of the present invention.

Create Hierarchy Procedure: FIG. 20

In an embodiment of the present invention, shown is a procedure (2001) consisting of a plurality of programmatic steps initiated by the user right clicking on a first record in a data table object (2003) causing a numeric variable J to be assigned the level value of one (1) establishing said record as master in the linking hierarchy. The user choice of a record in the user interface initiates the MOVE TO RECORD procedure (1201) which updates linked table pointers and updates the user interface (2005). Said procedure (1201) then returns control to the program (2007). The user then right clicks on a second record in a data table object (2009) causing a numeric variable K to be assigned the level value two (2) and establishing said record as a detail to the master record in the linking hierarchy. The detail index, data, and memory table pointers are updated (2011). The chosen detail record is highlighted (2013). Then the CLTF and CLTB index locks are checked (2015). If there are locks present, then the user is informed and all variables are cleared (2017). If there are no locks present, then write locks are placed on the CLTF and CLTB indexes (2019). A new record is inserted into the CLTF index and the CLTB index (2021). The CLTF.J and CLTB.J values are assigned the L# value of the master record (2023) where J represents indirect linking field order number in each index. Next, the CLTF.K and CLTB.K values are assigned the L# value of the detail record (2025) where K represents the Kth L2# field order number in each index. The write locks on CLTF and CLTB indexes are released (2027). The user is informed that the linking procedure is done and control is returned to the program.

Figure 21:
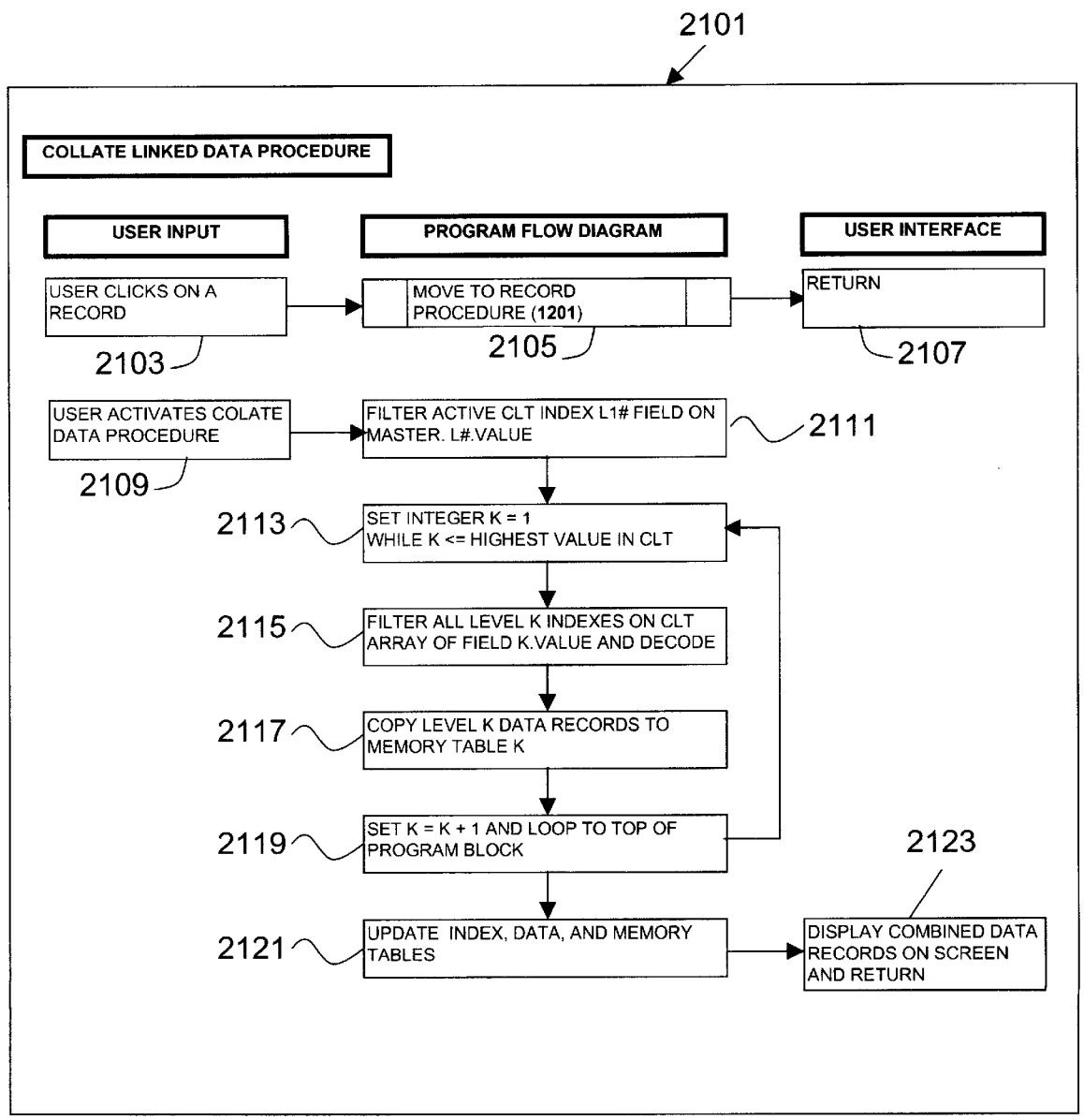
FIG. 21 is a flow chart with pseudocode showing the key programmatic steps to collate linked records stored in separate tables in said data set illustrated in FIG. 19 for display on a video monitor in a single table object in accordance with an embodiment of the present invention.

Collate Linked Data Procedure: FIG. 21

In an embodiment of the present invention, shown is a procedure (2101) consisting of a plurality of programmatic instructions activated by a user clicking on a record in a table object in the user interface to make it the master record (2103). THE MOVE TO RECORD procedure (2105) is called and then control is returned to the program (2107). Next the user activates the collate data button object (2109) (not shown). The active CLT index L1# field is filtered on the master record L# value (2111). An integer variable K is assigned the value one (1) and a while loop is initiated on the K value being smaller than or equal to the highest field number in the active CLT index (2113). The DECODE RECORD ID# procedure (1301) is called to build the relational linking arrays for the first level in the detail hierarchy (2115). The linked data records are copied into a single generalized memory table (2117). The integer variable K is incremented by one (1) and the procedure (2101) loops back to the while statement (2119). Once all data records in the hierarchy are collated into a single memory table all index, data, and memory tables are updated (2121). The combined data table is displayed in the user interface and control is returned to the program (2123).

A person skilled in the art will see that the above said procedure (2101) may be written to collate only those records from tables so marked at one or more levels in the hierarchy. This is done by adding a second field to the above said relations data table that would act as a flag for each said link to a master record indicating whether or not said records should be collated with other records for that particular master-detail relationship. Said flag could be further refined by assigning a set of indicia, each indicum specifying to which group a linked record should be collated with. This allows for a plurality of separate collation memory tables and displayed collated table objects in the user interface.

It can be seen from the above disclosure that the registry table, relational record table, CLTS, and URIS together define a very powerful and flexible system and methodology by which tabular records may be linked together to create complex and useful data models that may be used to closely represent in data the logic of real world processes. This is of extreme importance in successfully automating manual procedures and creating knowledge from stored informational items. Not only does the present invention provide the means for defining a complex associative memory model, in a more generalized form it provides the means for defining data clustering such that the links are not made directly between any two records but, instead, are made between groups of records stored in a plurality of tables in the data set. This allows for the definition of broad relational rules to a data set and performing cluster and fuzzy analysis in a more efficient manner. This generalization is achieved either by storing an array of linking values in each linking field of the CLTS or storing a pointer to an array of linking values in a plurality of separate linking array tables. The CLTS may also be generalized into an N-dimensional array of fields providing even more flexibility and complexity in the relational model.

In addition, a person skilled in the art will see that, when the number of records becomes very large in a set of data tables, the CLTS may become unwieldy. Under these circumstances the CLTS indexes may be structured to contain their own internal linking arrays so that any master record linking value has to be stored only once in a single uniquely identified record in said CLTS. When a new link is formed between said master record and any other record in said data set, the L# value stored in the detail record is added to said array in numeric order. This eliminates the necessity for including filtering and ordering steps in the above said MOVE TO RECORD procedure (1201) and can greatly simplify and speed up programmatic data operations. Two modifications of said concept are illustrated herein below in FIGS. 22 and 23.

Figure 22:
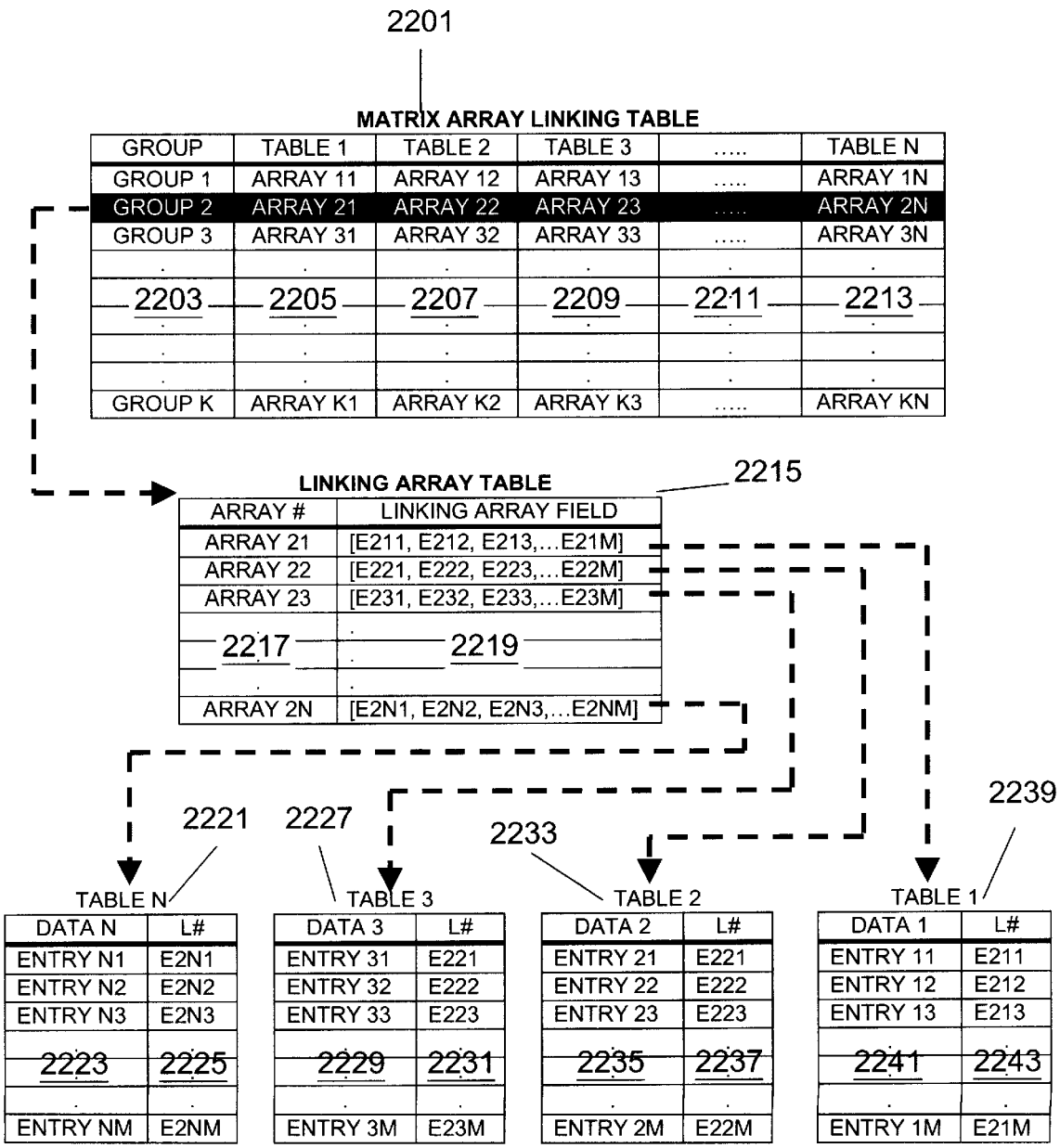
FIG. 22 is a partial view of a plurality of theoretical data tables organized, linked and filtered in a complex many-to-many relationship by a centralized matrix array linking table in accordance with an embodiment of the present invention.

Defining the Matrix Array Linking Table: FIG. 22

In an embodiment of the present invention, shown are six tables in partial schematic view. The first is the MATRIX ARRAY LINKING TABLE (2201) referred to as the MALT herein after. Said table (2201) contains a GROUP field (2203) for storing either the name of the data group or a linking value to a master group table (see FIG. 23 below for an example). An unspecified number of additional fields are contained in the MALT (2201). Shown are three labeled TABLE 1 (2205), TABLE 2 (2207), and TABLE 3 (2009), then an ellipsis (2211) to indicate an unspecified number of additional fields, and then a last field labeled TABLE N (2213) to indicate the Nth table. There are as 20 many fields in the MALT as there are tables in the data set. Each record in the MALT (2201) represents a separate set of links to a second LINKING ARRAY TABLE (2215) also referred to as LAT herein after. The LAT (2215) contains an ARRAY # field (2217) that contains a value that links to one of the plurality of array linking values stored in the TABLE I fields (2205, 2207, 2209, 2211, 2213) in the MALT (2201). The LAT (2215) also contains a LINKING ARRAY FIELD (2219) that contains the array of values defining a plurality of links to records in a specific table in the data set. Beneath said LAT (2215) are four data tables. From left to right they are the TABLE N (2221), TABLE 3 (2227), TABLE 2 (2233), and TABLE 1 (2239). Each said table contains a single representative data field labeled DATA N (2223), DATA 3 (2229), DATA 2 (2235), and DATA 1 (2241) respectively. Each said field represents an unspecified number of data fields in each said table. Finally, each said table contains an L# field (2225, 2231, 2237, and 2243) that stores the unique record identification number generated using the URIS. Said GROUP 2 record in the MALT (2201) is shown highlighted. Said LAT (2215) is shown filtered on each said table array linking field (2205 through 2213) value for each said table field in said MALT (2201). Each said LAF in each said filtered record in said LAT (2215) shows an array with an unspecified number of linking values. For example ARRAY 21 contains E221, E212, E213, . . . E21M as a linking set. Said linking values are used to find the record in said TABLE 1 (2239) with the identical record identification numbers stored in said L# field (2243). The other records in said LAT (2215) serve a similar purpose for each said table linked in said GROUP 2 record highlighted in said MALT (2201).

Figure 23:
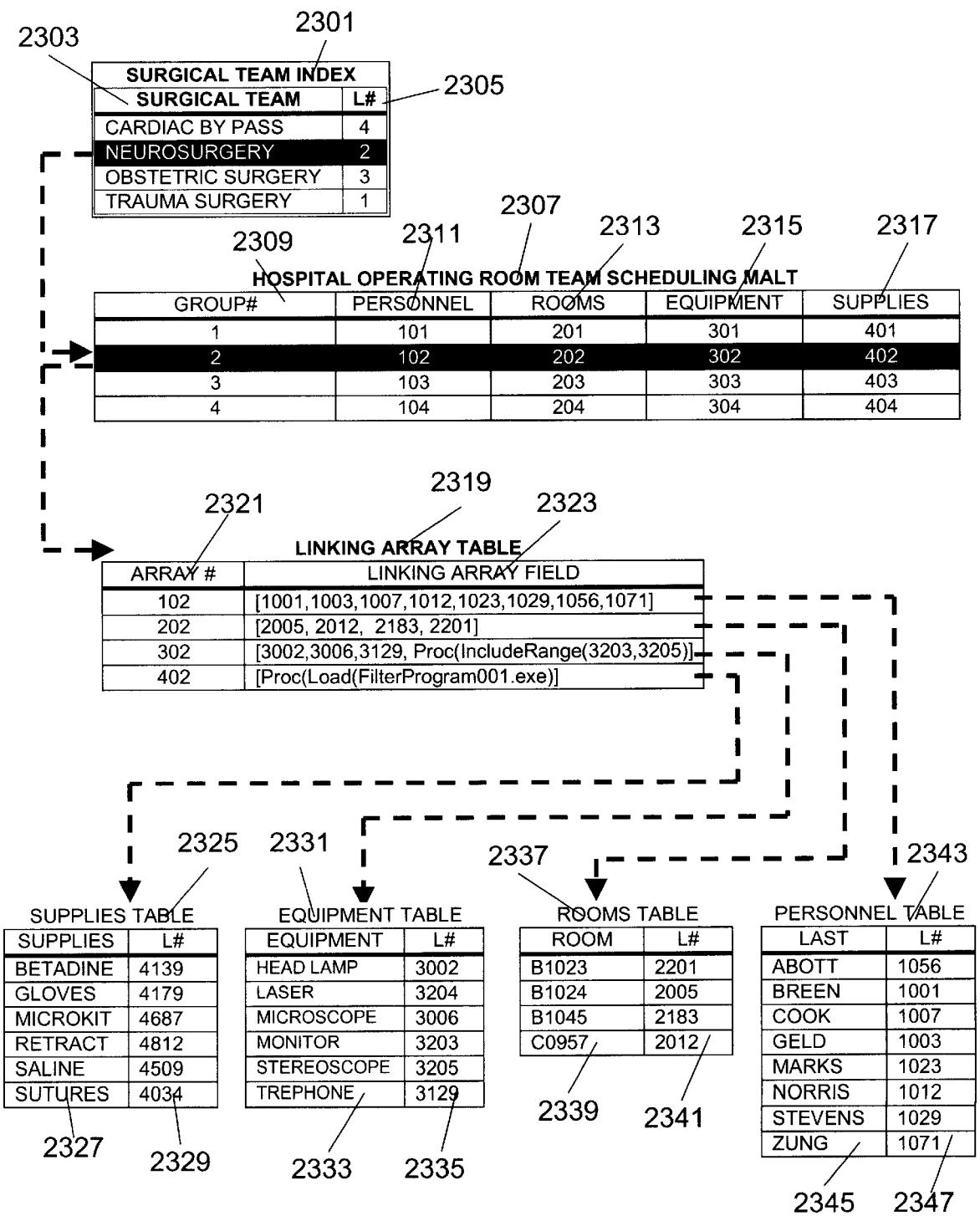
FIG. 23 is a partial view of a plurality of resource data table files organized, linked and filtered in a complex many-to-many relationship by a centralized multidimensional matrix array table filtered by a master group index table in accordance with an embodiment of the present invention.

Data Clustering Using the Matrix Array Linking Table: FIG. 23

In an embodiment of the present invention, shown are seven tables in partial schematic view. The first is the SURGICAL TEAM index table (2301) containing a GROUP NAME field (2303) and an L# field (2305). Below said SURGICAL TEAM index table (2301) is an HOSPITAL OPERATING ROOM TEAM SCHEDULING MALT (2307) containing a GROUP# field (2309), PERSONNEL field (2311), ROOMS field (2313), EQUIPMENT field (2315), and SUPPLIES field (2317). Below said MALT (2307) is an LAT index (2319) containing an ARRAY # field (2321) and LINKING ARRAY field (2323). Beneath said LAT index (2319) are four more data tables. The first is a SUPPLIES data table (2325) containing a SUPPLIES field (2327) and L# field (2325). The second is an EQUIPMENT data table containing EQUIPMENT field (2331) and L# field (2335). The third is a ROOMS data table (2337) containing a ROOM# field (2339) and L# field (2341). The fourth is a PERSONNEL data table (2343) containing a LAST NAME field (2345) and L# field (2347). When a user chooses record 2, NEUROSURGERY in said SURGICAL TEAM index table (2301) said MALT (2307) is filtered on said GROUP# field as shown by the highlighting of record 2. Said LAT (2319) is then filtered on said array linking values stored in said PERSONNEL (2311), said ROOMS (2313), said EQUIPMENT (2315), and said SUPPLIES (2317) fields of record 2. In turn, each of the four above said data tables (2325, 2331, 2337, and 2343) are then searched for record identification values stored in said LAF (2323) arrays for each said table and the resulting data records copied into corresponding memory tables and displayed in the user interface (not shown).

A person skilled in the art will see that the determination of which table in the data set to search on for any array of linking values in said LAF (2323) may be executed by a number of procedural approaches utilizing the capabilities of the registry in that an additional set of fields may be added to said registry to create and increment a unique array linking number domain that is identical in structure to that used by the URIS to generate unique record identification numbers. This provides a means of decoding the array identification number just as said DECODE RECORD ID# procedure (1301) does to identify the table linked to. Record 302 in said LAT index (2319) includes both an array of linking values and a procedure name called "IncludeRange( )" which is called by a Proc ( ) statement. This illustrates the further capability provided by the present invention to store procedural calls instead of a simple listing of record identification numbers. This means that built in table functions that yield a set of record numbers may be added or substituted for an array. A further capability provided by the present invention is illustrated in record 402 of said LAT index (2319) wherein said LAF (2323) does not contain an array of linking values but, instead, stores a procedural call to load a separate program called "FilterProgram001.exe". Therefore, pointers to external programs, dynamic link libraries, packages, and other externally compiled object code may be stored and executed in the course of creating data clusters. Finally, although not shown, a person skilled in the art will see that compiled object code, pseudocode (P code), and uncompiled source code may also be stored in said LAF field (2323) or pointed to by the a stored procedural call allowing for the integration of stored procedures in the data model presented herein. Now a tabular listing of master records may be displayed in the user interface. In fact, by choosing any one master record the user can be presented with a large, complex grouping of data records from across the database without having to worry about exactly how they are related within the data set.

Figure 24:
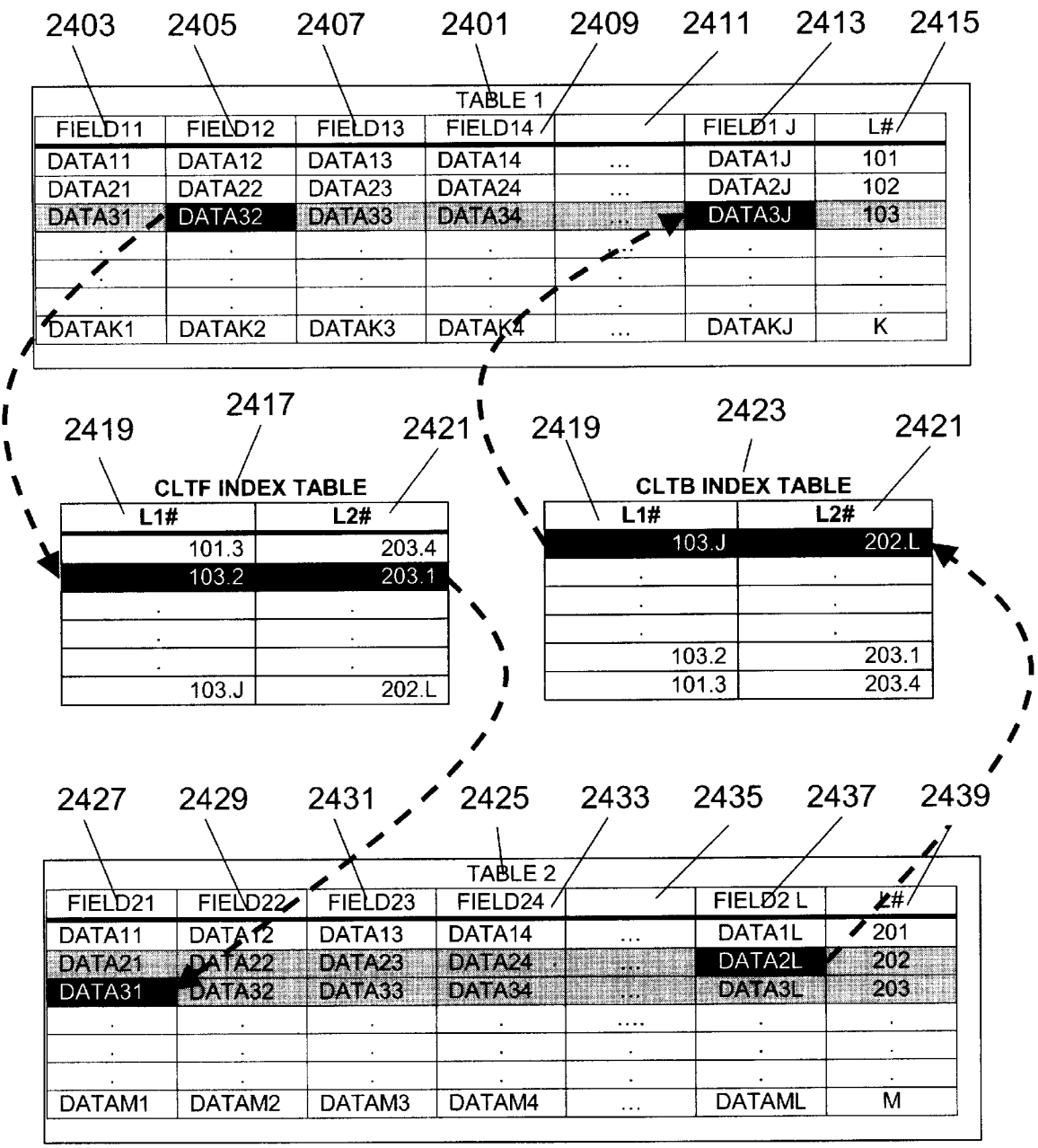
FIG. 24 is a partial view of two data tables and two complementarily ordered central linking table indexes to illustrate that the present invention may be further generalized to accommodate linking at the field level in accordance with an embodiment of the present invention.

Just as the present invention may be generalized to include an N-dimensional linking array, said invention may also be made more specific allowing the linking of any individual field value in one record of one table in the data set to a plurality of specific fields located in a plurality of other tables in the data set without reference to the actual value stored in any particular field. This capability of the present invention is illustrated by FIG. 24 herein below in a simple one-to-one link.

Defining Field Level Linking Using the CLTS and Field Order Number: FIG. 24

In an embodiment of the present invention, shown are partial schematic views of four tables. The first, called TABLE 1 (2401) contains data fields FIELD11 (2403), FIELD12 (2405), FIELD13 (2407), FIELD14 (2409), FIELD1J (2413) and an L# field (2415). The ellipsis (2411) indicates an unspecified number of additional fields. Each said data field is shown containing unspecified data elements for the purpose of illustrating the concept of field linking. Below and to the right of said TABLE 1 (2401) is a CLTF index table (2417) with L1# field (2419) and L2# field (2421). To the right of said CLTF index (2417) is a CLTB index (2423) with identical linking fields. Below the CLTF (2417) and CLTB (2423) indexes is the fourth table (2425) labeled TABLE 2 containing data fields labeled FIELD21 (2427), FIELD22 (2429), FIELD23 (2431), FIELD24 (2433), FIELD2L (2437), and an L# field (2439). The ellipsis (2435) indicates an unspecified number of additional fields. Each said data field is shown containing unspecified data elements for the purpose of illustrating the concept of field linking.

Most relational database systems assign a numeric identifier to each field in each table such that the first field is assigned the number one (1), the second field the number two (2), and so on through the last field. This number usually indicates the absolute position of said field in the record structure of the table an is often available to the programmer for use during development of procedural routines. Since each field number is unique within each table it may be combined with the record identification number, which is unique across all tables in the data set to create a field identification number that is also unique across all tables in the same said data set. Thus the present invention provides the unique capability to link indirectly from any one field to any other or a plurality of other fields in said data set. Therefore said FIELD12 (2405) (highlighted intaglio white on black) in record 103 (shown in gray) in said TABLE 1 (2401) may be linked to said FIELD21 (2427) (highlighted) in record 203 (gray) in said TABLE 2 (2425). This is done by combining each said record and field number pair to produce a unique decimal number. Therefore, since said FIELD12 (2405) is the second field in the record structure of said TABLE 1 (2401) the unique field number for said field in record 103 would be 103.2 herein below referred to as record-field indicia. Said record-field indicum is stored in said L1# field (2419) of said CLTF (2417) and said CLTB (2423) indexes just as a record indicum is in the previous figures included herein above. The indirect link is completed by storing said decimal number generated for said FIELD31 (2427) in record 203 of said TABLE 2 (2425), which is 203.1 in said L2# field (2421) of said CLTF (2419) and said CLTB (2423) indexes. And, as illustrated in said figure, both forward and backward linking is supported as said FIELD2L (2437) in record 202 of said TABLE 2 (2425) is indirectly linked to said FIELD1J (2413) in record 103 of said TABLE 1 (2401).

A person skilled in the art will see that the above said field linking may be executed by modification of the basic logic contained in said procedures illustrated herein above for the CLTS wherein said record-field indicum may be first parsed into its record and field part before the record part is decoded to identify the table of origin. A person skilled in the art will also see that since a field in one record links to a field in another or a plurality of other records by the above said structure, the records containing each said field are also linked by default. This means that a record may link to a single or a plurality of specified fields elsewhere in the data set while a field may link to a single or a plurality of specified records elsewhere in said data set. This adds an unprecedented level of capability in creating complex data models that represent real life processes and adds a new degree of data manipulation capabilities that will provide the means to model or automate industrial and scientific processes which have heretofore resisted such reduction.

Figure 25:
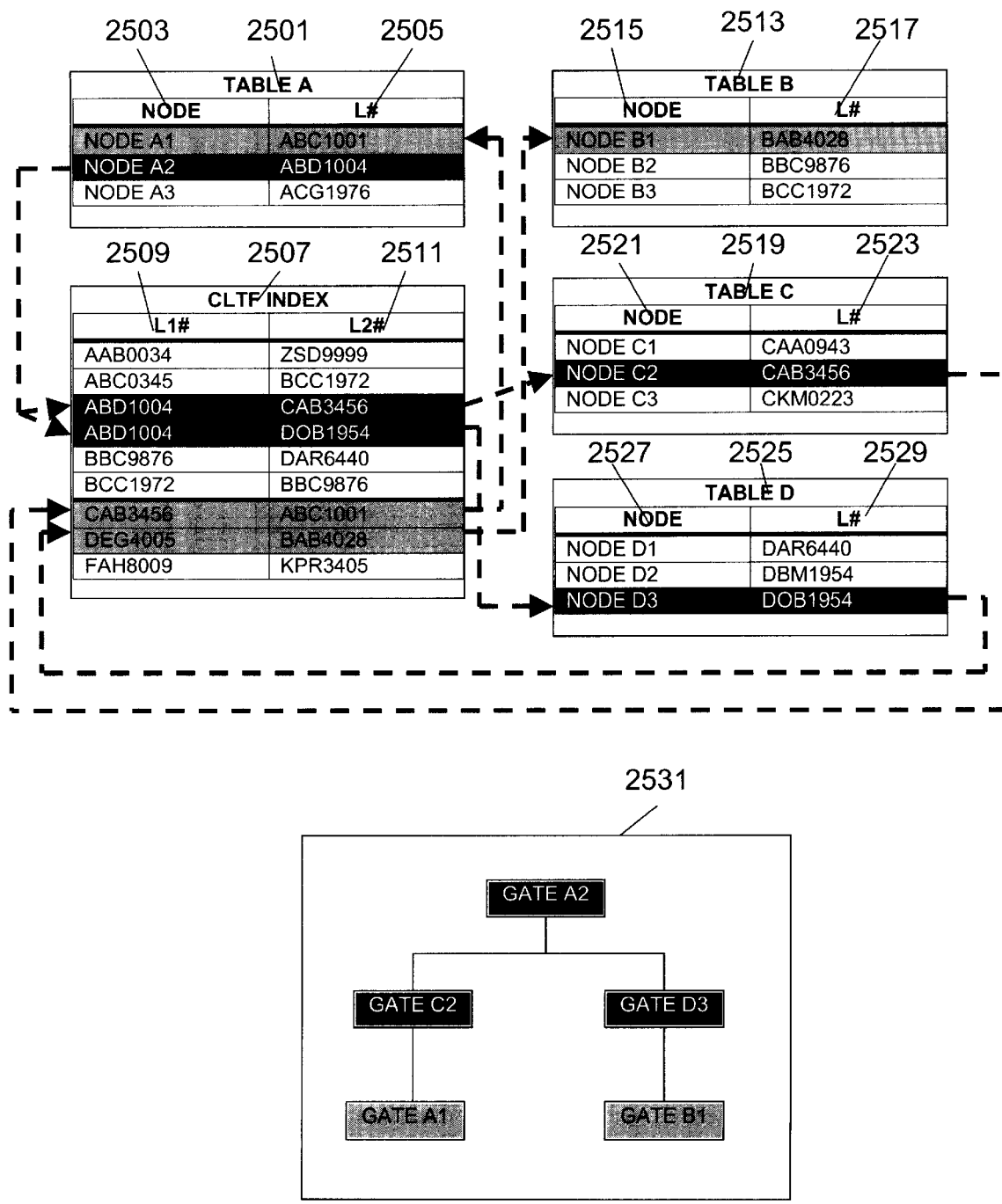
FIG. 25 is a partial view of four data tables, a central linking table, and a tree-node object to illustrate how linking structures may be predefined by storing an editable alphanumeric value in the linking fields of each record in a data set in accordance with an embodiment of the present invention.

Defining a First Gating Tree Node Model From the CLTS: FIG. 25

In an embodiment of the present invention, shown are partial schematic views of five tables and a single tree-node object that would be displayed in the user interface. TABLE A (2501) is an index table and contains a GATE field (2503) and an L# field (2505) and acts as the master table. To the right are three more data tables with similar record structures. TABLE B (2513) contains a GATE field (2515) and an L# field (2517). TABLE C (2519) contains a GATE field (2521) and an L# field (2523). TABLE D (2525) contains a GATE field (2527) and an L# field (2529). Below and to the left of said TABLE A (2501) is a CLTF index (2507) containing an L1# field (2509) and an L2# field (2511). At the bottom is a five node tree-node object (2531). The GATE A2 record in said TABLE A (2501) is highlighted and represents the master record in the masterdetail linking structure illustrated. Said L# value ABD1004 points to two highlighted records in said CLTF index (2507) that store the identical value in said L1# field (2509). Said two records point to the GATE C2 record in said TABLE C (2519) and GATE D3 in said TABLE D (2525) via said L2# field (2511)

values. In turn, GATE C2 acts as a master record with its said L# field (2523) value of CAB3456 pointing to a single record in said CLTF index (2507) (shown in dark gray) and GATE D# acts as a master record with its said L# field (2529) value of DEG4005 pointing to a single record in said CLTF index (2507) (shown in dark gray). Both linking records in said CLTF index (2507) point to the GATE A1 record in said TABLE A (2501) and GATE B1 in said TABLE B (2513) respectively (shown in dark gray). The tree-node object (2531) shows what the hierarchy of records looks like when displayed graphically in said user interface. Defining a Second Gating Tree Node Model by Changing One Value in the Above Said Gating Tree Node Model: FIG. 26

In an embodiment of the present invention, shown are partial schematic views of five tables and a single tree-node object that would be displayed in the user interface. The six tables are identical to those illustrated herein above in FIG. 25 except that different records have been highlighted and a single linking value changed. At the bottom is a five node tree-node object (2601). The GATE A2 record in said TABLE A (2501) is highlighted and represents the master record in the master-detail linking structure illustrated. The original said L# value ABD1004 has been changed by the user or through a programmatic procedure to ABC0345. Said record now points to one highlighted record in said CLTF index (2507) that stores the identical value in said L1# field (2509). Said record points to the GATE B3 record in said TABLE B (2513) via said L2# field (2511) value. In turn, GATE B3 acts as a master record with its said L# field (2523) value of BCC1972 pointing to a single record in said CLTF index (2507) (shown in dark gray). Said CLTF index (2507) record points to the GATE B2 record in said TABLE B (2501) (shown in light gray). Said record also acts as a master table and said record's said L# field (2517) value of BBC9876 points to a record in said CLTF index (2507) (shown in light gray) that, in turn, points to the GATE D1 record in said TABLE D (2525). The tree-node object (2601) shows what the hierarchy of records looks like when displayed graphically in said user interface. A person skilled in the art will see that said linking methodology described herein above in FIG. 25 and 26 may be further extended to include field level linking as illustrated in FIG. 24 herein above further extending the capabilities of the present invention.

It should be noted that none of the above said specifications and figures are meant to limit the scope of the present invention and that the above said capabilities are non-inclusive.

SUMMARY, RAMIFICATIONS, AND SCOPE

In summary, the indexing system, record structure, and linking methodology presented herein above provides a new and unique means of creating a sophisticated, flexible, and powerful database system for the storage, retrieval, and processing of an assembly of informational items as defined herein above to form a truly useful knowledge base and solve real world scientific, financial, and management problems.

There are many very important ramifications of the present invention. A non-inclusive review is presented herein below to further clarify its many benefits.

One of the most important requirements of a database system is its capability to maintain referential integrity. If a user wishes to delete a record in a data set, then the database model must provide a means for checking to see if any other records are linked to the first said record. Prior art requires the creation and maintenance of separate referential integrity tables that track each master-detail link. This adds significant space utilization and processing overhead. In the present invention referential integrity data is embodied in the very linking sets stored in the CLTS itself. Thus, all that is needed to add full referential integrity is to define procedures that search the CLTS indexes on the identifier of the record being deleted to find all linked records. At this point the user interface may prevent the deletion to maintain referential integrity, give the user the choice to delete the chosen record warning that referential integrity is threatened, give the user the choice of deleting the entire linking structure in the CLTS, as well as deleting all linked records, or delete the chosen record and by-passing its set of links in order to avoid breaking up the integrity of the rest of the links that may be dependent on said deleted record. The central storage of said referential data allows the user interface to simultaneously present the user with a visual display of the linking structure and included data records to help in the decision-making process.

A further ramification of the present invention involves data replication and distributed data on networks and internets. Indirect linking separates the linking data from the underlying data tables and centralizes said linking data in two or more index tables. This separation allows for distribution of either or both data and linking tables across a network to other servers or user workstations to decrease network traffic and reduce the processing overhead that the network servers are exposed to during the manipulation of a complex linking model. For example, since moving a pointer from one record to another in a table object in the user interface requires extensive table operations to update all dependently linked tables, replicating the CLTS to each user workstation allows the local CPU to do this work and then form a structured query language (SQL) request for only those data records needed from the server. On small to intermediate sized networks, transaction processing may be carried out with modification of the local CLTS indexes on the workstation and then committed along with newly inserted data records and/or edited fields to the server wherein the updated CLTS record or records are broadcast to the rest of the user workstations. Since the granularity of the present invention is at the field level, field level edits may be posted over the network instead of entire records greatly reducing network traffic and allowing for field level locking.

A further ramification of the present invention relates to the opposite of the above said distribution of data across a network. If the size and complexity of a data base is too big to safely and efficiently distribute across a network, or there are significant security needs requiring centralization on one server, the indirect linking methodology provides the superior solution. Server-base processing may be greatly enhanced because the CLTS indexes may be duplicated on said server to provide parallel access to the CLTS index records without having to duplicate the data tables in the data set. This saves space and processing overhead. And because of this separation of data and linking information, the CLTS provides an ideal system for effectively implementing parallel processing and multiple threaded programs on multiprocessor servers.

A further ramification of the present invention relates to queries. Prior art requires searching a large number of separate indexes and data tables when a query is executed on a complex data model. The data found in the query is stored in one or more separate flat file results tables wherein the original normalization is lost. Said query result tables must either be stored permanently or recreated each time a user wishes to review the query results. This uses valuable storage space and/or processing resources. The present invention allows for the writing of procedures that automatically search the CLTS on multiple passes to include all linked records and/or fields in a standard query results table. However, the use of a MALTS based data model further simplifies queries by providing a means to carry out array and matrix operations on the link array fields. More importantly, both the CLTS and, especially, the MALTS allow for the temporary or permanent storage of query results as an array of linking data that is incorporated into the data structure itself. In essence each record in said MALT may represent a stored set of pointers recapitulating a query on the data set. This means that a separate set of query result tables with duplicate data records do not have to be created and stored greatly reducing storage requirements and enhancing the speed of data processing. In fact, the CLTS and MALTS allow the direct incorporation of any query result into the data model wherein any new relational links created by said query may be added to said CLTS or MALTS. Then, only when needed, query results may be generated and collated into one of a plurality of data structures including new data tables, lists, memory arrays, and multidimensional grids such as spreadsheets.

A further ramification of the present invention relates to unwanted data duplication. Although prior art goes far in reducing data duplication through a process known as normalization, there are many real life processes that cannot be fully normalized by prior art data models. One of the most commonly irreducible processes is found in the hourly scheduler illustrated herein above in FIG. 19 wherein each day contains a repeating sequence of times. Indirect linking allows for the definition of relational structures that provide the option to reuse a set of record entries from one or more tables at different points within an hierarchy without causing unwanted many-to-one relationships that automatically occur in traditional database designs. This can reduce the storage requirements of some types of database applications by a significant factor and speed up data queries.

A further ramification of the present invention relates to complex, nonhierarchical processes wherein linking at the record level is inadequate to accurately model real world processes. The present invention allows variable linking relationships to be defined between individual fields, individual fields and records, and a plurality of fields, as well as entire groups of records stored in a plurality of tables. This linking may be dynamic or static allowing a predefined linking structure where changes depend not on changing the values stored in the CLTS or MALTs but on the value entered in a particular field or plurality of fields in a data table. This means that modeling of complex processes is further enhanced and provides the means to create sophisticated associative knowledge bases and advanced decision-making systems based on complex criteria that resist the use of simple logical operators.

A further ramification of the present invention relates to process reductionism and creating layers of complexity in the study of complex real world and natural processes. With the generalization of the CLTS to the MALTS, the data model accommodates several added features. For example, each group of linking array values may be designed to provide different levels of access to data either at the table level, record level, or even the field level. This type of capability is not provided by prior art data models. Combined with the storage of procedures or pointers to procedures, this capability allows for context sensitive access and display of a subset of data from a complex linkage by simply accessing or having access to any particular record in the MALTS. In this way layers of complexity in a data model may be built up sequentially in a set of MALT records providing a powerful means of developing learning tools that successively present more and more complex knowledge or for segregating a plurality of related processes in a complex system to examine the effects of each separately or in combination with one or a plurality of others.

A further ramification of the present invention relates to natural language interfacing with stored data and the creation of associative data models. The capacity to easily create, maintain, and access nonhierarchical and recursive linking structures using the present invention provides the means to form data structures that give a user multiple points of access to related data via records stored in a plurality of different tables in a data set. This forms a powerful, associative cross-index that makes searching for and finding one or a group of data records and fields much easier. This allows for achieving a more natural user interface wherein a user might ask questions of the underlying data without having to preprogram the exact query logic for each question in advance.

A further ramification of the present invention relates to data reuse and the creation of alternate data relational models without duplicating the underlying data tables. A person skilled in the art will become aware that, because linking information is stored entirely separate from the data tables, a plurality of separate sets of CLTF and CLTB indexes may be defined. Each such defined set of indexes may contain entirely separate or overlapping sets of linking identifiers. And each said separate set of CLTS indexes may be dedicated to an identical or different but overlapping set of data tables; organized in one or more data sets as defined in one or more registry tables. This generalized structure allows for using one or a plurality of identical data tables in more than one data set without having to duplicate data records. This brings the further capability of partitioning data efficiently across networks and providing the means of allowing the inclusion of a plurality of data tables into an integrated set of automated solutions to a plurality of separate but overlapping real life processes that are interdependent on each other, feed back cybernetically on each other, and do not necessary follow a strict top-down, master-detail, one-to-many relational model that prior art forces on the designer. This is especially important for continuous quality improvement systems implemented by large manufacturing organizations and health-care institutions.

A further ramification of the present invention relates to confidentiality and access to sensitive data. A number of methodologies may be implemented to add security features to the MALTS. For example, one or a plurality of specialized security fields may be added to said MALT providing the means to form an unlimited number of access levels to data spread across a data set. Said capability is of tremendous value to such fields as health-care, where need-to-know often cuts across tables, records, and fields and makes confidentiality of patient records difficult to maintain on a computer system using prior art relational models. In addition, the separation of data and linking information allows for the creation of a more effective firewall to protect valuable and confidential data.

A further ramification of the present invention relates to solving expensive problems of transitioning from one data model to another in an organization. The redesign of legacy data models and the programs that run them is one of the greatest costs in upgrading personal and corporate data automation systems. Over time, as the needs of an individual or organization grow and change, the type of information being gathered and the relational links required change. Often, a new system implemented to meet these needs does not fully accommodate the old data relationships and requires a drastic change in the way a person or organization does business. Presently there is no easy way to create a smooth or incremental path between two business models. The present invention solves this problem. As noted herein above, the registry table used in combination with the URIS, and CLTS, and/or MALTS provides a user or organization with the means to combine new tables of information with legacy data structures as the disk storage and computing power will allow. This is achieved by registering each legacy table, adding a single new field for storing a unique record identifier, and generating identifiers for each legacy record in a batch process. Then, the legacy links between said legacy data records may all be recapitulated in the CLTS by the creation of another batch program which analyzes the original relational model and inserts a new record in the CLTS for each link found.

OTHER EMBODIMENTS OF THE INVENTION

The above embodiment is not meant to limit the scope of the present invention. A person skilled in the art will see that many other unspecified capabilities may be accessed through minor modifications of the indexing system and linking methodology. For example, whole tables may be included in the relational model by using the TIN value as its identification number in a compound informational identification system. Linking at the table, record, and field level may be accommodated as well This is effected by combining the table, record, and field identifiers into a three-part indicum. For example:

TABLE#.RECORD#.FIELD#

A set of programmatic procedures may be created to parse the combined identifier to locate the table of origin, record of origin, and field of origin in a link.

In another embodiment of the present invention a new type of data table may be defined that consists of an internal set of sub-tables with one or more fields and an internal CLTS or MALTS with predefined links that are not accessible by the user. In other words, a data set may be so structured that it acts as a single table for the purposes of the user interface.

Many other methods of generating an index and linking informational items may be inferred from the above invention. In addition, all tables may be broken up into separate field lists each with one item and one linking field. The resulting lists could then be structured through a set of centralized linking tables and matrix array linking tables. Non-numeric record indicia may be used in the present invention and FIG. 25 and FIG. 26 show alphanumeric indicia. However, the use of purely numeric indicia provides both arithmetic flexibility in forming domains in said registry and for calculating individual unique record indicia during run time. In addition, numeric indicia provide the means to create truly massive domains. For example, given that present day computers can generate and store numbers as large as 10 raised to the $4097^{th}$ power (a one followed by 4097 zeros) with 15 or more significant digits, each domain can be made so large that there will be no possibility that the user will ever run out of unique sequence numbers for a given table. For example a data set with one thousand tables entered in said registry may have each said table assigned a trillion record domain, without using up more than a minute percentage of available indicum; more than enough for just about any database project anticipated by any business.

What is claimed is:

1. A computer implemented a method of indexing and linking information which comprises the steps of:

forming at least one first table on at least one first electronic-based medium wherein said table is a data table;

forming at least one first field as a linking field and at least one second field as a data entry field in a first record structure of said at least one first table;

inserting at least one first record in said at least one first table;

assigning at least one first alphanumeric indicum to said at least one first record;

storing said at least one first alphanumeric indicum in said at least one first field in said at least one first record;

storing at least one first informational item in said at least one second field in said at least one first record;

forming at least one second table on one or more of said at least one first and at least one second electronic-based medium wherein said table is a data table;

forming at least one third field as a linking field and at least one fourth field as a data entry field in a first record structure of said at least one first table inserting at least one second record in one of said at least one second and said at least one first table;

assigning at least one second alphanumeric indicum to said at least one second record;

storing said at least one second alphanumeric indicum in said at least one third field in said at least one second record;

storing at least one second informational item in said at least one fourth field in said at least one second record;

forming at least one third table on one or more of said at least one first, said at least one second, and at least one third electronic-based medium wherein said table is a central linking table;

forming at least one fifth and at least one sixth field as indirect linking fields in a third record structure of said at least one third table;

inserting at least one third record in said at least one third table;

storing said at least one first alphanumeric indicum in said at least one fifth field in said at least one third record in said at least one third table; and storing said at least one second alphanumeric indicum in said at least one sixth field in said at least one third record in said at least one third table such that a link is formed between said at least one first record in said at least one first table and said at least one second record in one of said at least one second and said at least one first table.

2. The method of indexing and linking information as recited in claim 1, wherein said at least one first alphanumeric indicum stored in said at least one first field in said at least one first table defines said at least one first table as its own at least one first primary index.

3. The method of indexing and linking information as recited in claim 1, wherein said at least one second alphanumeric indicum stored in said at least one second field in said at least one second record table defines said at least one second table as its own at least one second primary index.

4. The method of indexing and linking information as recited in claim 1, wherein said at least one first alphanumeric indicum stored in said at least one fifth field and said at least one second alphanumeric indicum stored in said at least one sixth field in said at least one third table define said at least one third table as its own at least one third primary index.

5. The method of indexing and linking information as recited in claim 1, further comprising the steps of:

forming at least one fourth table on one or more of said at least one first, said at least one second, said at least one third, and at least one fourth electronic-based medium wherein said table is a central linking table;

forming at least one seventh and at least one eighth field as indirect linking fields in a fourth record structure of said at least one fourth table;

inserting at least one fourth record in said at least one fourth table;

storing said at least one first alphanumeric indicum in said at least one seventh field in said at least one fourth record in said at least one fourth table; and storing said at least one second alphanumeric indicum in said at least one eighth field in said at least one fourth record in said at least one fourth table such that a link is formed between said at least one second record in one of said at least one second and said at least one first table and said at least one first record in said at least one first table.

6. The method of indexing and linking information as recited in claim 5, wherein said at least one second alphanumeric indicum stored in said at least one eighth field and said at least one first alphanumeric indicum stored in said at least one seventh field in said at least one fourth table define said at least one fourth table as its own at least one fourth primary index wherein said at least one fourth primary index is complementary to said at least one third primary index.

7. A method of indexing and linking information as recited in claim 1, further comprising the steps of:

forming at least one first data set;

forming at least one fifth table on one or more of said at least one first, said at least one second, said at least one third, said at least one fourth, and at least one fifth electronic-based medium wherein said table is a registry table;

forming at least one ninth, at least one tenth, at least one eleventh, at least one twelfth, at least one thirteenth, at least one fourteenth, at least one fifteenth, at least one sixteenth, and at least one seventeenth field in a fifth record structure of said at least one fifth table;

inserting at least one fifth record in said at least one fifth table;

assigning at least one third informational item consisting of the name and location of said at least one fifth table on one or more of said at least one first, said at least one second, said at least one third, said at least one fourth, and at least one fifth electronic-based medium to register said at least one fifth table in said data set;

storing said at least one third informational item in said at least one tenth field in said at least one fifth record;

assigning at least one first domain size value to said at least one fifth table;

storing said at least one first domain size value in said at least one eleventh field in said at least one fifth record;

assigning at least one third alphanumeric indicum as at least one first domain start value;

storing said at least one first domain start value in said at least one twelfth field in said at least one fifth record;

assigning at least one first domain end value wherein at least one first domain consisting of a set of unique, ordered alphanumeric indicia are defined between and inclusive of said at least one first domain start value and said at least one first domain end value;

storing said first domain end value in said at least one thirteenth field in said at least one fifth record;

storing said first domain start value in said at least one ninth field in said at least one fifth record;

inserting at least one sixth record in said at least one fifth table;

obtaining at least one fourth alphanumeric indicum from said at least on first domain;

deleting said at least one first domain start value stored in said at least one twelfth field in said at least on fifth record;

storing said at least one fourth alphanumeric indicum in said at least one twelfth field in said at least one fifth record;

assigning said at least one fourth alphanumeric indicum to said at least one sixth record;

storing said at least one fourth alphanumeric indicum in said at least one ninth field in said at least one sixth record;

assigning at least one fourth informational item consisting of the name and location of said at least one first table on said at least one first electronic-based media to register said at least one first table in said data set;

storing said at least one fourth informational item in said at least one tenth field in said at least one sixth record;

assigning at least one second domain size value to said at least one first table;

storing said at least one second domain size value in said at least one eleventh field in said at least one sixth record;

calculating at least one second domain start value from said at least one fourth unique alphanumeric indicum and said at least one second domain size value;

storing said at least one second domain start value in said at least one twelfth field in said at least one sixth record;

calculating at least one second domain end value from said at least one fourth unique alphanumeric indicum and said at least one second domain size value wherein at least one second domain consisting of a set of unique, ordered alphanumeric indicia is defined between and inclusive of said at least one second domain start value and said at least one second domain end value;

storing said second domain end value in said at least one thirteenth field in said at least one sixth record;

inserting at least one seventh record in said at least one fifth table;

obtaining at least one fifth alphanumeric indicum from said at least one first domain;

deleting said at least one third alphanumeric indicum stored in said at least one twelfth field in said at least on fifth record;

storing said at least one fifth alphanumeric indicum in said at least one twelfth field in said at least one fifth record;

assigning said at least one fifth alphanumeric indicum to said at least one seventh record;

storing said at least one fifth alphanumeric indicium in said at least one ninth field in said at least one seventh record;

assigning at least one fifth informational item consisting of the name and location of said at least one second table on one or more of said at least one first and said second electronic-based media to register said at least one second table in said data set;

storing said at least one fifth informational item in said at least one tenth field in said at least one seventh record;

assigning at least one third domain size value to said at least one second table;

storing said at least one third domain size value in said at least one eleventh field in said at least one seventh record;

calculating at least one third domain start value from said at least one fifth unique alphanumeric indicium and said at least one third domain size value;

storing said at least one third domain start value in said at least one twelfth field in said at least one seventh record;

calculating at least one third domain end value from said at least one fifth unique alphanumeric indicium and said at least one third domain size value wherein at least one third domain consisting of a set of unique, ordered alphanumeric indicia are defined between and inclusive of said at least one third domain start value and said at least one third domain end value, and;

storing said at least one third domain end value in said at least one thirteenth field in said at least one seventh record such that the intersection of said unique alphanumeric indicia defined in each of said at least one first, said at least one second, and said at least one third domains is an empty set.

8. The method of indexing and linking information as recited in claim 7, wherein each said at least one alphanumeric indicium defined by each said at least one domain when assigned to each said at least one record in each said at least one table provides a means to locate said table in said at least one registry table and on said at least one electronic-based media.

9. A method of indexing and linking information as recited in claim 7, further comprising the steps of providing a means for examining, changing, and storing table locking information in said at least one seventeenth field in said at least one fifth table.

10. A method of indexing and linking information as recited in claim 7, wherein said unique alphanumeric indicia stored in said at least one ninth field in said at least one fifth data table define said at least one fifth data table as its own at least one fifth primary index.

11. The method of indexing and linking information as recited in claim 7, further comprising the steps of:

forming at least one first secondary index on said at least one first table;

providing a means for displaying a plurality of said at least one first records in said at least one first table in at least one first table object in said user interface ordered by said at least one first secondary index;

displaying said at least one first records in said at least one first table object in said user interface ordered by said at least one first secondary index;

forming at least one second secondary index on said at least one second table;

providing a means for displaying a plurality of said at least one second records in said at least one second table in at least one second table object in said user interface ordered by said at least one second secondary index;

displaying said at least one second records in said at least one second table object in said user interface ordered by said at least one second secondary index;

providing a means for allowing the user to choose one of a plurality of said at least one first record in said at least one first table object;

choosing said at least one first record in said at least one first table object;

providing a means for locating said at least one first table as said name and location stored in said at least one tenth field in said at least one sixth record in said at least one fifth table;

locating said at least one first table as said name and location stored in said at least one tenth field in said at least one sixth record in said at least one fifth table;

locating every said at least one third record in said at least one third table wherein said at least one fifth field contains said at least one first alphanumeric indicium;

forming at least one first ordered list consisting of said at least one second alphanumeric indicia stored in said at least one sixth field in all said at least one third records located by said at least one first alphanumeric indicium stored in said at least one fifth field;

storing said at least one first ordered list of said at least one second alphanumeric indicia in said at least one fourteenth field in said at least one sixth record in said at least one fifth table;

locating said at least one second table;

locating every at least one second record in said at least one second table wherein said at least one third field contains said at least one second alphanumeric indicium in said first at least one ordered list stored in said at least one fourteenth field in said at least one sixth record in said at least one fifth table;

providing a means for displaying said set of located at least one second records in said at least one second table ordered by said at least one second secondary index in said at least one second table object in said user interface, and;

displaying said set of located at least one second records in said at least one second table ordered by said at least one second secondary index in said at least one second table object in said user interface.

12. The method of indexing and linking information as recited in claim 7, further comprising the steps of:

providing a means for allowing the user to choose one of a plurality of said at least one second record in said at least one second table object;

choosing said at least one second record in said at least one second table object;

providing a means for locating said at least one second table as said name and location stored in said at least one tenth field in said at least one seventh record in said at least one fifth table;

locating said at least one second table as said name and location stored in said at least one tenth field in said at least one seventh record in said at least one fifth table;

locating every said at least one fourth record in said at least one fourth table wherein said at least one eighth field contains said at least one second alphanumeric indicium;

forming at least one second ordered list consisting of said at least one first alphanumeric indicia stored in said at least one seventh field in all said at least one fourth records located by said at least one second alphanumeric indicum stored in said at least one eighth field;

storing said at least one second ordered list of said at least one first alphanumeric indicia in said at least one fourteenth field in said at least one seventh record in said at least one fifth table;

locating said at least one first table;

locating every at least one first record in said at least one first table wherein said at least one first field contains said at least one first alphanumeric indicum in said first at least one second ordered list stored in said at least one fourteenth field in said at least one seventh record in said at least one fifth table;

providing a means for displaying said set of located at least one first records in said at least one first table ordered by said at least one first secondary index in said at least one first table object in said user interface, and;

displaying said set of located at least one first records in said at least one first table ordered by said at least one first secondary index in said at least one first table object in said user interface.

13. A method of indexing and linking information as recited in claim 7, further comprising the steps of:

locking said at least one fifth and said at least one first table;

providing a means of determining if all said unique and ordered alphanumeric indicia defined by said at least second domain have been assigned;

determining if all said unique and ordered alphanumeric indicia defined by said at least second domain have been assigned;

providing a means of creating at least one fourth domain for said at least one first table in said at least one first data set;

obtaining at least one sixth unique alphanumeric from one of said at least one second domain and said at least one fourth domain;

deleting one of said at least one second and said at least one fourth domain start value in said at least one twelfth field in said at least one fifth table;

storing said sixth unique alphanumeric indicum in said twelfth field in said at least fifth table;

inserting at least one eighth record in said at least one first table;

storing said sixth unique alphanumeric indicum in said at least one first field in said at least one eighth record in said at least one first table; and releasing said locks on said at least one first and said at least one fifth tables.

14. The method of indexing and linking information as recited in claim 13, further comprising the step of storing a plurality of said alphanumeric indicia assigned to said at least one tables registered in said at least one first dataset in a plurality of said at least one seventeenth fields in said at least one fifth table wherein said plurality of indicia stored in said at least one seventeenth field indicate that all records inserted in said table indicated by said at least one record is automatically linked to each said chosen record in each said table indicate by said plurality of indicia.

15. A method of indexing and linking information as recited in claim 1, further comprising the steps of:

forming at least one sixth table on one or more of said at least one first, said at least one second, said at least one third, said at least one fourth, said at least one fifth and at least one sixth electronic-based medium wherein said table is a data table;

forming at least one eighteenth field as a linking field and at least one nineteenth field as a data entry field in a first record structure of said at least one first table registering said at least one sixth table in said at least one first data set wherein at least one fourth domain is formed;

inserting at least one ninth record in said at least one sixth table;

obtaining at least one seventh unique alphanumeric indicum from said at least one fourth domain;

assigning at least one seventh unique alphanumeric indicum to said at least one ninth record;

storing said at least one seventh unique alphanumeric indicum in said at least one eighteenth field in said at least one ninth record;

storing at least one sixth informational item in said at least one nineteenth field in said at least one ninth record;

forming at least one seventh table on one or more of said at least one first, said at least one second, said at least one third, said at least one fourth, said at least one fifth, said at least one sixth, and at least one seventh electronic-based medium wherein said table is a central linking table;

forming at least one twentieth, at least one twenty-first, and at least one twenty-second field as indirect linking fields in a seventh record structure of said at least one seventh table;

inserting at least one tenth record in said at least one seventh table;

storing said at least one first alphanumeric indicum in said at least one twentieth field in said at least one tenth record in said at least one seventh table;

storing said at least one second alphanumeric indicum in said at least one twenty-first field in said at least one tenth record in said at least one seventh table; and storing said at least one seventh alphanumeric indicum in said at least one twenty-second field in said at least one tenth record in said at least one seventh table such that a link is formed between said at least one first record in said at least one first table, said at least one second record in said at least one second table, and said at least one ninth record in said at least one sixth table.

16. The method of indexing and linking information as recited in claim 15, wherein a plurality of indirect linking fields may be ordered in a plurality of central linking tables that define each said table's own primary index such that the total possible number of said central linking index tables equals the combinatorial number of said indirect linking fields.

17. A method of indexing and linking information as recited in claim 1, further comprising the steps of:

assigning at least one ninth unique alphanumeric indicum to said at least one second field in said first record structure in said at least one first table;

assigning at least one tenth unique alphanumeric indicum to said at least one fourth field in said second record structure in said at least one second table;

assigning at least one eleventh unique alphanumeric indicum to said at least one eighteenth field in said at least one sixth record structure in said at least one sixth table; and providing a means to combine each said unique record indicum with each said unique field indicum such that each said resulting combined record-field indicum is unique in said at least one first data set.

18. A method of indexing and linking information as recited in claim 17, wherein substituting said combined record-field indicum in said fields in said at least one third and said at least one fourth tables form a link between all said fields in said records.

19. A method of indexing and linking information as recited in claim 17, wherein substituting said combined record-field indicum in said fields in said at least one third and said at least one fourth tables form a link between all said records.

20. A method of indexing and linking information as recited in claim 1 wherein said fields in said record structures of said central linking tables may store a plurality of said alphanumeric indicia assigned to said records stored in said data tables as an ordered list such that said ordered list links said plurality of said records into a data cluster.

21. A method of indexing and linking information as recited in claim 20 wherein said fields in said record structures of said central linking tables may store at least one alphanumeric indicum such that said indicum identifies said ordered list stored in at least one field stored in another said central linking table such that said ordered list links said plurality of said records into a data cluster.

22. A method of indexing and linking information as recited in claim 1 wherein values of alphanumeric indicia stored in said linking fields in said data tables may be accessed and changed such that said change creates a different indicum that links to an alternate plurality of records in said plurality of said central linking tables such that an alternate set of a plurality of records are linked to in said data set.

* * * * *